US012730843B2

(12) United States Patent
Schilders

(10) Patent No.: US 12,730,843 B2
(45) Date of Patent: Sep. 8, 2026

(54) IN-SITU TENANCY IN GRAPH-BASED MODELS

(71) Applicant: Infosys Limited, Bangalore (IN)

(72) Inventor: Steven Schilders, Columbus, IN (US)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 19/094,444

(22) Filed: Mar. 28, 2025

(65) Prior Publication Data

US 2026/0050632 A1 Feb. 19, 2026

Related U.S. Application Data

(63) Continuation of application No. 18/588,927, filed on Feb. 27, 2024, now Pat. No. 12,287,830.

(60) Provisional application No. 63/448,831, filed on Feb. 28, 2023, provisional application No. 63/448,724, filed on Feb. 28, 2023, provisional application No. 63/448,761, filed on Feb. 28, 2023, provisional application No. 63/448,738, filed on Feb. 28, 2023, provisional application No. 63/448,711, filed on Feb. 28, 2023.

(51) Int. Cl.
*G06F 16/901* (2019.01)
*G06F 16/22* (2019.01)

(52) U.S. Cl.
CPC ...... *G06F 16/9024* (2019.01); *G06F 16/2272* (2019.01)

(58) Field of Classification Search
CPC ......................... G06F 16/9024; G06F 16/2272
See application file for complete search history.

(56) References Cited

U.S. PATENT DOCUMENTS

2021/0216516 A1* 7/2021 Chen .................. G06F 16/2228
2021/0255938 A1* 8/2021 Baker ................. G06F 11/1469
2022/0300416 A1* 9/2022 Hajewski ............ G06F 16/9024
2022/0353143 A1* 11/2022 Hill ....................... H04L 41/147
2023/0023655 A1* 1/2023 Hui ..................... G06F 3/04845

* cited by examiner

*Primary Examiner* — Jared M Bibbee
(74) *Attorney, Agent, or Firm* — Finnegan, Henderson, Farabow, Garrett & Dunner, LLP

(57) ABSTRACT

An overlay system is provided that includes a plurality of storage elements and processing circuitry coupled thereto. The plurality of storage elements store a plurality of executable graph-based models such that first and second storage elements store first and second executable graph-based models, respectively. Each executable graph-based model includes a plurality of nodes. The processing circuitry receives a stimulus to share a first node of the first executable graph-based model with a second node of the second executable graph-based model. The processing circuitry instantiates a tenant overlay node that is associated with the second node and includes a set of constraints to be adhered to by the second node while sharing the first node. The processing circuitry creates a sharing channel as a medium between the first and second storage elements. The sharing channel and the tenant overlay node enable sharing of the first node with the second node.

20 Claims, 12 Drawing Sheets

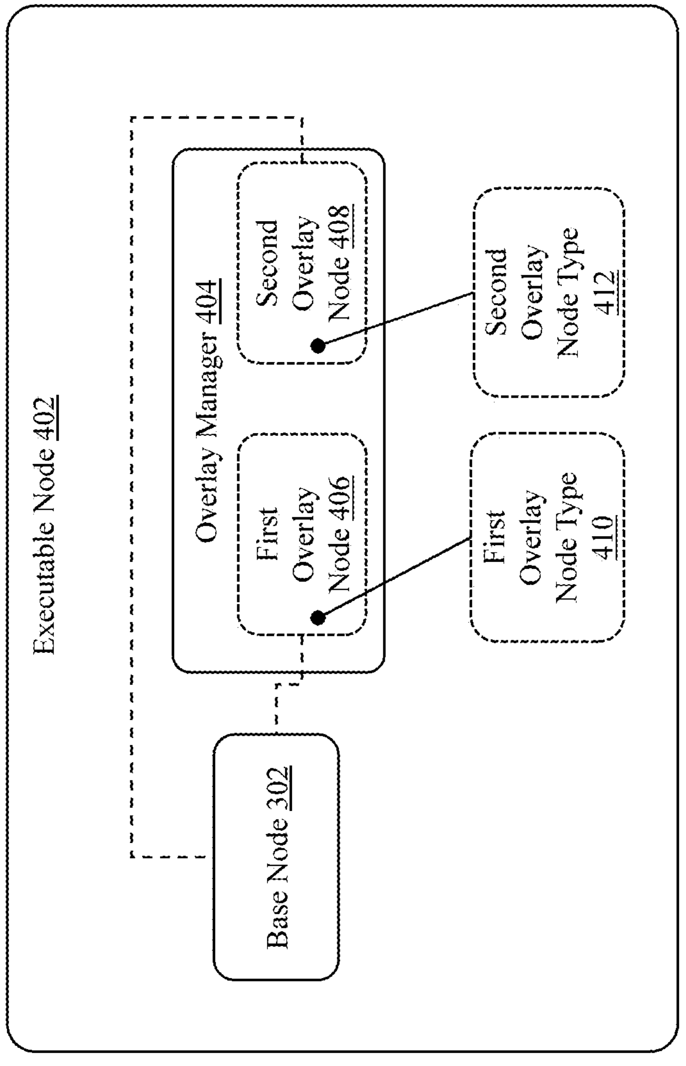
FIG. 4

700

IN-SITU TENANCY IN GRAPH-BASED MODELS

CROSS-REFERENCE TO RELATED APPLICATIONS

This patent application is a continuation of U.S. patent application Ser. No. 18/588,927, filed on Feb. 27, 2024, which refers to, claims priority to, and claims the benefit of U.S. provisional application No. 63/448,738 filed Feb. 28, 2023, U.S. provisional application No. 63/448,724 filed Feb. 28, 2023, U.S. provisional application No. 63/448,831 filed Feb. 28, 2023, U.S. provisional application No. 63/448,711 filed Feb. 28, 2023, and U.S. provisional application No. 63/448,761 filed Feb. 28, 2023. Each of the above-referenced applications is hereby incorporated herein by reference in its entirety.

FIELD OF THE DISCLOSURE

Various embodiments of the present disclosure relate generally to graph-based models. More specifically, various embodiments of the present disclosure relate to tenancy in executable graph-based models.

BACKGROUND

Last few decades have witnessed extraordinary advancement in the field of technology. One of the miracles of such advancement is tenancy which allows users to share resources (for example, storage, processor, or the like) associated with service providers (for example, cloud-based service providers) without actually needing to set up the required infrastructure. In such a scenario, one or more tenants of a service provider utilize associated resources for facilitating one or more tasks (for example, data storage, data processing, or the like) associated therewith. This allows the tenants to create an isolated environment within the infrastructure of the service provider. Such an approach for utilizing resources associated with the service provider requires a significantly lower cost as compared to the cost of establishing the required infrastructure. However, the aforementioned concept of tenancy has certain drawbacks that make it risky and inconvenient. The service provider stores data associated with each tenant in a centralized database. Hence, a common security solution is applied to each tenant's data. Therefore, in an instance of an intrusion, a breach at one point of the centralized database leaves each tenant's data vulnerable. Also, none of the tenants have control over storage location of associated data. Moreover, the aforementioned concept of tenancy doesn't allow sharing of resources (for example, data, data structure, processing logic, or the like) among the tenants. This not only leads to restrictions on re-use of resources but also increases duplicity within an infrastructure of the service provider.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating in-situ tenancy in executable graph-based models are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIG. 4 is a block diagram that illustrates an executable node within the executable graph-based mode, in accordance with an embodiment of the present disclosure;

DETAILED DESCRIPTION

Figure 1:
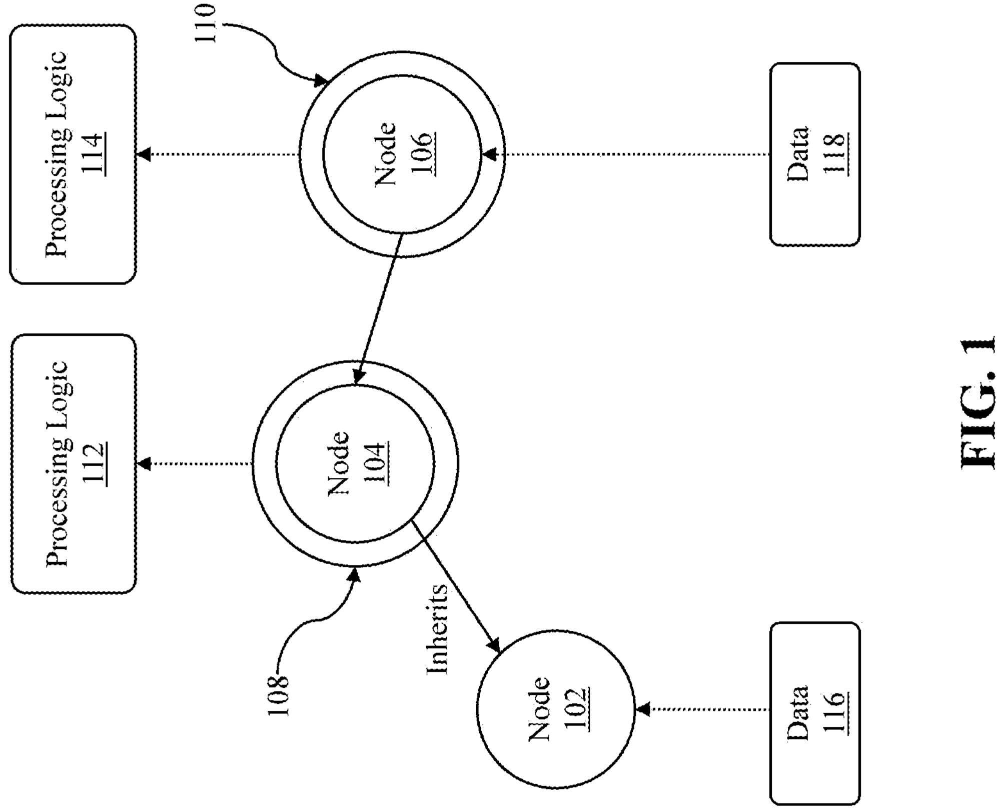
FIG. 1 is a graph that illustrates a composition of an executable graph-based model, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview

With tremendous growth in the field of technology, digitization has found its applications in various domains. For each of these applications, various resources or services are required. An infrastructure is required to be established for use of such resources or services. However, the set-up of the infrastructure could be expensive and may require significant resources (for example, space, electricity, machinery, human resources, or the like). An alternative to setting-up of the infrastructure is to use service providers (for example, cloud-based platforms) that provide the required infrastructure in form of services (for example, software as a service, platform as a service, infrastructure as a service, or the like). However, such service providers face numerous challenges which make them vulnerable as well as undesirable. One of the many challenges faced by the service providers is security. Notably, the service providers provide a centralized storage that is shared by tenants who avail associated services. The service providers apply a single security layer to protect data of each of its tenants. However, such security leaves the service providers vulnerable to security threats, as a breach of data associated with one tenant leaves data of the remaining tenants unsecured as well. Further, the cloud-based platform does not allow its tenants to interact with each other. Therefore, the tenants are not allowed to share resources with each other. This leads to hindrance in re-use and sharing of resources. Consequently, duplicity of resources (for example, data and data structure) within the cloud-based platform also increases. Further, in case a tenant of a service provider wishes to avail services of another tenant of the same or another service provider, the tenant is required to bypass the service provider and go through an external route (for example, an external application program interface) to access such services.

The present disclosure is directed to facilitation of in-situ tenancy in a plurality of executable graph-based models of an overlay system. The executable graph-based models are customized hypergraphs having hyper-edges that include one or more roles and vertices that are realized by way of executable nodes. Each executable node is a base node that is extended by way of one or more overlays. Each executable node is associated with a particular node type. For example, an edge node corresponds to a base node with an edge node type. Nodes (for example, base nodes and executable nodes) are connected with other nodes by way of roles included in an edge node therebetween. In some embodiments, roles are represented by way of nodes of role node type. Role node between two nodes may be indicative of details regarding an association therebetween.

The overlay system disclosed herein is configured to have a plurality of tenants that use resources (for example, data structure, data storage, data, processing logic, or the like) associated with the overlay system. These resources are implemented within the overlay structure by way of nodes of the executable graph-based models. A tenant may be a business solution that is implemented by way of the overlay system. Each tenant has corresponding one or more executable graph-based models within the overlay system. Additionally, each tenant has dedicated resources such as storage, data, data structure, processing logic that is owned thereby. Therefore, each tenant is able to control the administration of resources being used thereby. Hence, apart from a global security solution applied to the overlay system, each tenant is able to define their own security solution based on their specific security requirements. Further, the overlay system disclosed herein allows each of its tenants to share and use one or more resources of the overlay system that is allocated to any one of the remaining tenants of the overlay system. The overlay system also allows one tenant to access one or more services offered by another tenant, of the overlay system. Such sharing of resources and services among the tenants is done by sharing nodes of one tenant with another tenant. In an instance, such sharing is administered by a first tenant that owns a resource represented by way of a node that is being shared. Such administration is performed by instantiating a tenant overlay node with the node that is being shared, where the tenant overlay node includes a set of constraints that is defined by the first tenant. The set of constraints is to be adhered to by a second tenant that is sharing the node. The term 'sharing' refers to using a node that is owned by another tenant of the overlay system. Further, the present disclosure discloses creation of a sharing channel between the first tenant and the second tenant. The sharing channel acts as a medium between the first and second tenants. The sharing channel and the tenant overlay node enable resource sharing between the first and second tenants. Also, the present disclosure discloses creation of a feedback channel between the first and second tenants. The feedback channel is used by the second tenant to communicate data associated with use of the shared resource by the second tenant.

Presently, the service providers do not allow their tenants to have their customized security solutions. Hence, a single security breach leaves all the tenants vulnerable. The overlay system disclosed herein separates each of its tenants in a way that each tenant is allowed to have a corresponding security solution that meets its security criteria. Therefore, a security breach at one tenant's resources does not leave resources of other tenants vulnerable. Further, currently, the service providers do not allow their tenants to share resources. The overlay system disclosed herein allows its tenants to share resources with other tenants. Such sharing of resources reduces duplicity, increases resource utilization, and increases efficiency of each tenant as it can avail a plethora of services in real-time without having to involve any third-party.

Notably, the present disclosure allows for facilitation of in-situ tenancy in the overlay system which allows the tenants of the overlay system to share resources (for example, data storage, data structure, data, processing logic, or the like) with one another in real-time and without involving any third party. Further, the present disclosure allows each tenant who owns a shared resource to set terms and conditions in accordance with which the resource will be used by any other tenant of the overlay system. Such sharing not only reduces duplicity within the overlay system but separation of resources among the tenants also allows each tenant to define their own security solutions. Therefore, a security breach at one tenant's resources does not leave other tenants vulnerable. Application area of the present disclosure may include any domain that utilizes external service providers (for example, software development, database management system, machine learning, robotics, or the like).

Figure Description

FIG. 1 is a graph that illustrates a composition of an executable graph-based model 100, in accordance with an embodiment of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlays 108 and 110, respectively. Although not shown, it will be apparent to a person skilled in the art that the node 102 can be similarly extended with processing logic via the use of one or more overlays. Each overlay includes processing logic, such as processing logic 112 and 114 which are associated with the overlays 108 and 110, respectively. At run-time, data, such as data 116 and 118, is associated with the nodes 102 and 106, respectively. Further, the overlays 108 and 110 of the nodes 104 and 106, respectively, provide the functionality to respond to stimuli and interact with, manipulate, or otherwise process the data for analytics based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2).

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 is applicable to a range of time-critical systems where efficient processing of the stimuli is required.

Figure 2:
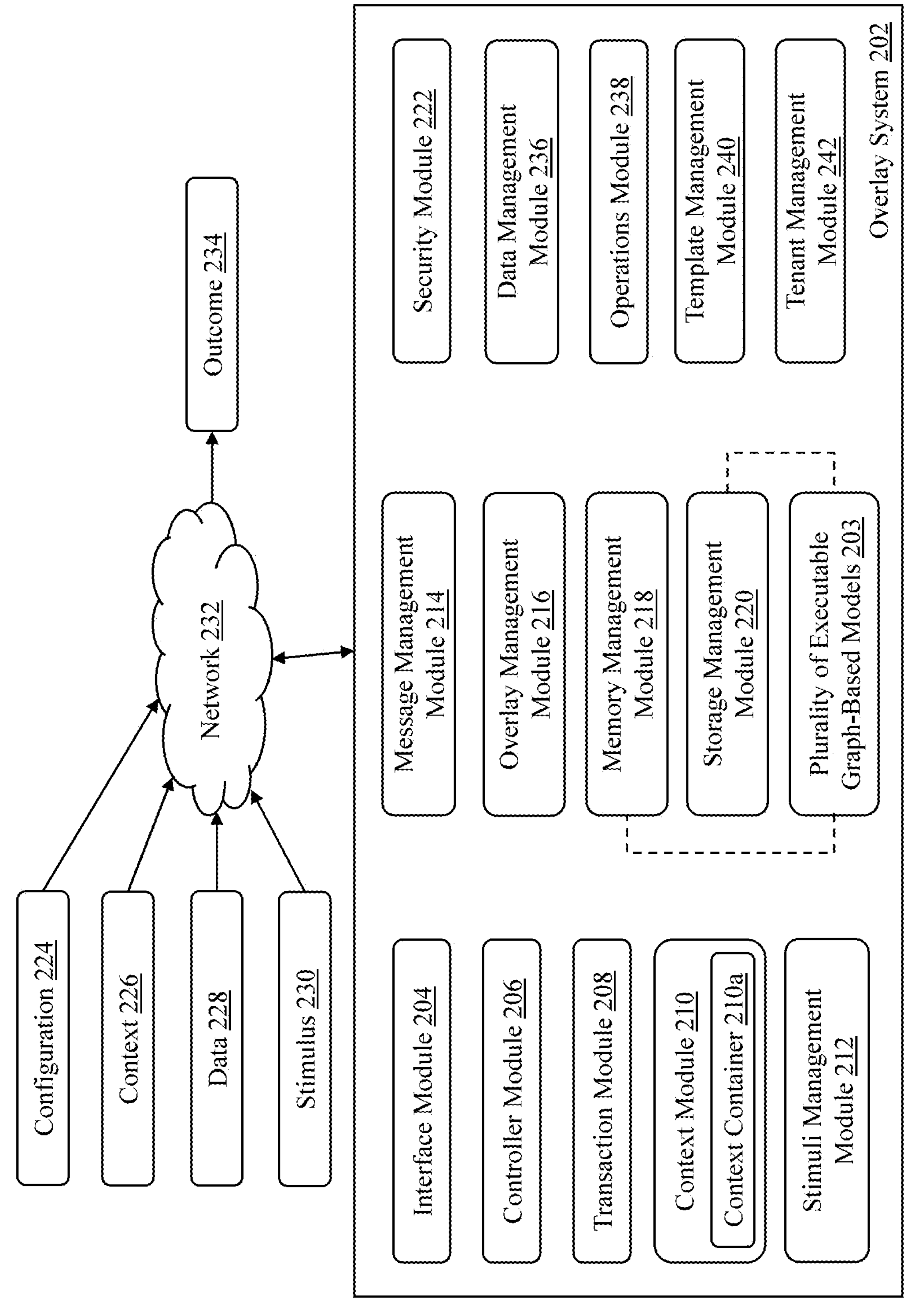
FIG. 2 is a block diagram that illustrates a system environment of an overlay system for execution, management, and configuration of a plurality of executable graph-based models, in accordance with an embodiment of the present disclosure.

FIG. 2 is a block diagram that illustrates a system environment 200 of an overlay system 202 for execution, management, and configuration of a plurality of executable graph-based models 203, in accordance with an embodiment of the present disclosure. Referring to FIG. 2, the overlay system 202 includes the plurality of executable graph-based models 203. The plurality of executable graph-based models 203 includes various executable graph-based models such as the executable graph-based model 100. The overlay system 202 further includes an interface module 204, a controller module 206, a transaction module 208, a context module 210, a stimuli management module 212, a message management module 214, an overlay management module 216, a memory management module 218, a storage management module 220, and a security module 222. FIG. 2 further shows a configuration 224, a context 226, data 228, a stimulus 230, a network 232, and an outcome 234. Additionally, the overlay system 202 includes a data management module 236, an operations module 238, a template management module 240, and a tenant management module 242. In some embodiments, all the modules of the overlay system 202 except for the plurality of executable graph-based models 203 may collectively form processing circuitry that performs in-situ tenancy within the overlay system 202.

The overlay system 202 may include suitable logic, circuitry, interfaces, and/or code, executable by the circuitry, that may be configured to facilitate in-situ tenancy using the plurality of executable graph-based models 203. In-situ tenancy in the overlay system 202 corresponds to a concept of providing sovereign identity and ownership to each tenant of the overlay system 202. A tenant of the overlay system corresponds to a person, organization, or the like, that utilizes one or more resources, features, or the like, facilitated by the overlay system 202. In-situ tenancy additionally corresponds to a concept of sharing of resources owned by a first tenant of the overlay system 202 with a second tenant of the overlay system 202 such that the second tenant uses the shared resources for execution of one or more of its operations. Throughout the description, the sharing of the first tenant's resources by the second tenant corresponds to use of the first tenant's resources by the second tenant for performing one or more tasks thereof. The tasks may be related to a business solution associated with the second tenant and/or the overlay system 202. The business solution associated with the overlay system 202 may refer to an application (for example, a business application, a robotic system, an autonomous vehicle system, an inventory system, a task assignment/allocation system, or the like) that may be implemented by way of the overlay system 202.

The overlay system 202 includes the plurality of executable graph-based models 203 that corresponds to an application-specific combination of data and processing functionality which is manipulated, processed, and/or otherwise handled by the other modules within the overlay system 202 for facilitating in-situ tenancy therein based on the stimulus 230 received by the overlay system 202.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 224, the context 226, the data 228, and the stimulus 230 may be received by the interface module 204 via the network 232. Similarly, outputs (e.g., the outcome 234) produced by the overlay system 202 are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the plurality of executable graph-based models 203, or the like). In one embodiment, the interface module 204 is communicatively coupled (e.g., connected either directly or indirectly) to one or more overlays within each of the plurality of executable graph-based models 203.

The controller module 206 may include suitable logic, circuitry, interfaces, and/or code, executable by the circuitry, configured to handle and process interactions and executions within the overlay system 202. As will be described in more detail below, stimuli (such as the stimulus 230) and their associated contexts provide the basis for all interactions within each of the plurality of executable graph-based models 203. Processing of such stimuli may lead to execution of processing logic associated with one or more overlays within each of the plurality of executable graph-based models 203. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 230) and processes them based on a corresponding context (e.g., the context 226). The context 226 determines the priority that is to be assigned to processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in an event of an expected or unexpected software or hardware fault or failure. The controller module 206 is configured to handle the processing of the stimulus 230 and transactions through architectures such as parallel processing, grid computing, priority queue techniques, or the like. In one embodiment, the controller module 206 and the transaction module 208 are communicatively coupled (e.g., connected either directly or indirectly) to one or more overlays within each of the plurality of executable graph-based models 203.

As stated briefly above, the overlay system 202 utilizes a context-driven architecture whereby the stimulus 230 within the overlay system 202 is associated with the context 226 which is used to adapt the handling or processing of the stimulus 230 by the overlay system 202. That is to say that the handling or processing of the stimulus 230 is done based on the context 226 associated therewith. Hence, the stimulus 230 is a contextualized stimulus. The context 226 may include details such as user name, password, access token, device information, time stamp, one or more relevant identifiers (IDs), or the like, that are required for processing of messages within each of the plurality of executable graph-based models 203. Each context within the overlay system 202 may be extended to include additional information that is required for the processing of the message (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 226) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of one or more messages associated with the operation execution context. Contexts within the overlay system 202 can be external or internal. While some contexts apply to all application areas and problem spaces, some applications may require specific contexts to be generated and used to process the received stimulus 230. As will be described in more detail below, each of the plurality of executable graph-based models 203 is configurable (e.g., via the configuration 224) so as only to execute within a given execution context for a given stimulus.

As shown, the context module 210 includes a context container **210*a* that includes a set of defined contexts. Each defined context of the set of defined contexts pertains to a context that is associated with one or more operations for facilitating in-situ tenancy within the overlay system 202. That is say that, one or more contexts of the set of defined contexts are indicative of the one or more operations to be executed for performing one or more tasks for enabling sharing of resources among tenants of the overlay system 202. The set of defined contexts may include at least one of a node sharing context, a node sharing restriction context, a node sharing permission context, and a node sharing termination context. The node sharing context may be indicative of enabling sharing of one or more resources of the first tenant with the second tenant, of the overlay system 202**. The node sharing context may be one of a read-only sharing context, a read-write sharing context, and a read, write, and return context. The read-only sharing context is indicative of sharing of the one or more resources of the first tenant with the second tenant such that the second tenant is allowed to access the one or more resources but is prohibited from making any modification to the resources. The read and write sharing context is indicative of sharing of the one or more resources of the first tenant with the second tenant such that the second tenant is allowed to access as well as modify the one or more resources. The read, write, and return sharing context is indicative of sharing of the one or more resources of the first tenant with the second tenant such that the second tenant is allowed to access and modify the one or more resources. Additionally, the second tenant must communicate process data (for example, modifications to the one or more resources, transactional data associated with the modifications, or the like) to the first tenant. The node sharing restriction context may be indicative of one or more restrictions to be imposed while sharing the one or more resources of the first tenant with the second tenant. The node sharing permission context may be indicative of one or more permissions to be given to the second tenant while sharing the one or more resources of the first tenant with the second tenant. The node sharing termination context may be indicative of termination of sharing of the one or more resources of the first tenant with the second tenant.

The stimuli management module 212 may include suitable logic, circuitry, interfaces, and/or code, executable by the circuitry, configured to process externally received stimuli (e.g., the stimulus 230) and any stimuli generated internally from any module within the overlay system 202. The stimuli management module 212 is communicatively coupled (e.g., connected either directly or indirectly) to one or more overlays within the plurality of executable graph-based models 203 to facilitate the processing of stimuli within the plurality of executable graph-based models 203. The overlay system 202 utilizes different types of stimuli such as a command (e.g., a transactional request), a query, or an event received from an external system such as an Internet-of-Things (IoT) device. As previously stated, a stimulus (such as the stimulus 230) can be either externally or internally generated. In an example, the stimulus 230 may be a message that is internally triggered (e.g., generated) from any of the modules within the overlay system 202. Such internal generation of the stimulus 230 indicates that something has happened within the overlay system 202 and subsequent handling by one or more other modules within the overlay system 202 may be required. Internal stimulus 230 can also be triggered (e.g., generated) from the execution of processing logic associated with overlays within the plurality of executable graph-based models 203. In another example, the stimulus 230 may be externally triggered and may be generated based on an input received via a user interface associated with the controller module 206. The externally triggered stimulus 230 may be received in the form of a textual, audio, or visual input. The externally triggered stimulus 230 may be associated with the intent of a user to execute an operation indicated by the stimulus 230. The operation is executed in accordance with information included in the context 226 associated with the stimulus 230.

The stimuli management module 212 may receive the stimuli (such as the stimulus 230) in real-time or near-real-time and communicate the received stimuli to one or more other modules or nodes of at least one of the plurality of executable graph-based models 203. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of messages associated with each stimulus. In one embodiment, the stimuli management module 212 processes the received stimuli in accordance with a predetermined configuration (e.g., the configuration 224) or dynamically determines what processing needs to be performed based on the contexts associated with the stimuli and/or based on a state of a corresponding executable graph-based model of the plurality of executable graph-based models 203. A state of each of the plurality of executable graph-based models 203 refers to a current state of each node of the corresponding executable graph-based model at a given point in time. The state of each of the plurality of executable graph-based models 203 is dynamic, and hence, may change based on processing of an internal/external stimulus or a message by any of its nodes. In some examples, the processing of a stimulus (such as, the stimulus 230) results in the generation, communication, or processing of one or more messages that further result in one or more outcomes (e.g., the outcome 234) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 238 of the overlay system 202.

The message management module 214 may include suitable logic, circuitry, interfaces, and/or code, executable by the circuitry, configured to manage all data or information (e.g., the data 228) associated with messages communicated within the overlay system 202 e.g., for a given communication network implemented by way of one of the plurality of executable graph-based models 203. Operations performed by the message management module 214 include data loading, data unloading, data modeling, and data processing operations associated with the generation and communication of messages within the overlay system 202. The message management module 214 is communicatively coupled (e.g., connected either directly or indirectly) to one or more other modules within the overlay system 202 to complete some or all of these operations. For example, the storage of data or information associated with messages is handled in conjunction with the storage management module 220 (as described in more detail below).

The overlay management module 216 may include suitable logic, circuitry, interfaces, and/or code, executable by the circuitry, configured to manage all overlays within the overlay system 202. Operations performed by the overlay management module 216 include overlay storage management, overlay structure modeling, overlay logic creation and execution, and overlay loading and unloading (within the plurality of executable graph-based models 203). The overlay management module 216 is communicatively coupled (e.g., connected either directly or indirectly) to one or more other modules within the overlay system 202 to complete some or all of these operations. For example, overlays can be persisted in some form of physical storage using the storage management module 220 (as described in more detail below). As a further example, overlays can be compiled and preloaded into memory via the memory management module 218 for faster run-time execution.

The memory management module 218 may include suitable logic, circuitry, interfaces, and/or code, executable by the circuitry, configured to manage and optimize the memory usage of the overlay system 202. The memory management module 218 thus helps to improve the responsiveness and efficiency of the processing performed by one or more of the modules within the overlay system 202 by optimizing the memory handling performed by these modules. The memory management module 218 uses direct memory or some form of distributed memory management architecture (e.g., a local or remote caching solution). Additionally or alternatively, the memory management module 218 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 224) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 218 is communicatively coupled (e.g., connected either directly or indirectly) to one or more overlays within each of the plurality of executable graph-based models 203.

The storage management module 220 may include suitable logic, circuitry, interfaces, and/or code, executable by the circuitry, configured to manage the temporary or permanent storage of data associated with messages being communicated within the overlay system 202. The storage management module 220 is any suitable low-level storage device solution (such as a file system) or any suitable high-level storage technology such as another database technology (e.g., relational database management system (RDBMS) or NoSQL database). The storage management module 220 is directly connected to the storage device upon which the relevant data is persistently stored. For example, the storage management module 220 can directly address the computer-readable medium (e.g., hard disk drive, external disk drive, or the like) upon which the data is being read or written. Alternatively, the storage management module 220 is connected to the storage device via a network such as the network 232. As will be described in more detail later in the present disclosure, the storage management module 220 uses manifests to manage the interactions between the storage device and the modules within the overlay system 202. In one embodiment, the storage management module 220 is communicatively coupled (e.g., connected either directly or indirectly) to one or more overlays within each of the plurality of executable graph-based models 203.

As described, storage, loading, and unloading of each of the plurality of executable graph-based models 203 or one or more components thereof is facilitated by the memory management module 218 and the storage management module 220. The memory management module 218 and the storage management module 220 may facilitate such operations by interacting with the storage device. In the present disclosure, the plurality of executable graph-based models 203 may be stored in a plurality of storage elements of the overlay system 202. The plurality of storage elements corresponds to a combination of the memory management module 218 and storage management module 220 that may be configured to store the plurality of executable graph-based models 203. In some embodiments, the plurality of storage elements may be storage modules managed by the memory management module 218 and storage management module 220, collectively. Each storage element of the plurality of storage elements may have one of a distributed architecture and a centralized architecture.

The security module 222 may include suitable logic, circuitry, interfaces, and/or code, executable by the circuitry, configured to manage the security of the overlay system 202. This includes the security at a tenant level, a system level, a storage element level, and a module level. That is to say that, the security module 222 may be configured to implement one or more security solutions that are specific to (i) each tenant of the overlay system 202, (ii) the overlay system 202, (iii) each storage element of the overlay system 202, and/or (iv) each module of the overlay system 202. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 222 can enforce a hypertext transfer protocol secure (HTTPS) protocol with the necessary certification. As a further example, if the data or information associated with the message received or processed by the overlay system 202 contains Personally Identifiable Information (PII) or Protected Health Information (PHI), the security module 222 can implement one or more layers of data protection to ensure that the PII or PHI are correctly processed and stored. In an additional example, in implementations whereby the overlay system 202 operates on United States of America citizen medical data, the security module 222 may enforce additional protections or policies as defined by the United States Health Insurance Portability and Accountability Act (HIPAA). Similarly, if the overlay system 202 is deployed in the European Union (EU), the security module 222 may enforce additional protections or policies to ensure that the data processed and maintained by the overlay system 202 complies with the General Data Protection Regulation (GDPR). In one embodiment, the security module 222 is communicatively coupled (e.g., connected either directly or indirectly) to one or more overlays within each of the plurality of executable graph-based models 203, thereby directly connecting security execution to the data/information in the plurality of executable graph-based models 203. The security module 222 thus acts as a centralized coordinator that works in conjunction with the message management module 214 and the overlay management module 216 for managing and executing security-based overlays.

The data management module 236 may include suitable logic, circuitry, interfaces, and/or code, executable by the circuitry, configured to manage all data or information within the overlay system 202 (e.g., the data 228) for a given application. Operations performed by the data management module 236 include data loading, data unloading, data modeling, and data processing. The data management module 236 is communicatively coupled (e.g., connected either directly or indirectly) to one or more other modules within the overlay system 202 to complete some or all of these operations. For example, data storage is handled by the data management module 236 in conjunction with the storage management module 220.

The operations module 238 may include suitable logic, circuitry, interfaces, and/or code, executable by the circuitry, configured to track operational metrics and the behavior of all modules of the overlay system 202. Operational metrics of a module is indicative of statistics associated with performance of the module while performing an operation (for example, communication, data processing, stimulus processing, or the like). The performance of the module may be improved by taking one or more measures to improve operational metrics associated therewith. Such measures may be taken based on one or more analytic insights that are indicative of the performance of the module.

The template management module 240 may include suitable logic, circuitry, interfaces, and/or code, executable by the circuitry, configured to enable the overlay system 202 to implement a templated version of one or more nodes of each of the plurality of executable graph-based models 203. The template management module 240 may be configured to create one or more predefined templates in each of the plurality of executable graph-based models 203. The template management module 240 may be further configured to generate one or more node instances of the predefined templates for the implementation of templated version of each of the plurality of executable graph-based models 203. Notably, the template management module 240 ensures ontology integrity by enforcing structure and rules of a template when generating instances of the template at run-time. Ontology integrity refers to consistency, accuracy, and correctness of an ontology. Thus, the template management module 240 ensures that the consistency, accuracy, and correctness of the ontology of each of the plurality of executable graph-based models 203 are maintained while generating the instances of the template at run-time. The template management module 240 may be communicatively coupled (i.e., connected either directly or indirectly) to one or more nodes and/or one or more overlays within each of the executable graph-based models 203.

The tenant management module 242 may include suitable logic, circuitry, interfaces, and/or code, executable by the circuitry, configured to facilitate in-situ tenancy within the plurality of executable graph-based models 203. The tenant management module 242 provides one or more functionalities for managing stimulus that pertains to in-situ tenancy within the overlay system 202. The tenant management module 242 is configured to use one or more overlay nodes (for example, tenant overlay nodes) of each of the plurality of executable graph-based models 203 for facilitating the functionalities for managing stimulus that pertains to in-situ tenancy. The tenant management module 242 facilitates sharing of data structure, data, processing logic, and data associated with execution of shared processing logic.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

Having described the overlay system 202 for executing and managing the plurality of executable graph-based models 203, the description will now turn to the elements of an executable graph-based model (for example, the executable graph-based model 100); specifically, the concept of a node. Unlike conventional graph-based systems, all elements (e.g., data, overlays, etc.) within the executable graph-based model (e.g., the executable graph-based model 100) are implemented as nodes. As will become clear, this allows the plurality of executable graph-based models 203 to be flexible, extensible, and highly configurable.

For the sake of simplicity, FIGS. 3A, 3B, 4, and 5 are described with respect to the executable graph-based model 100.

Figure 3A:
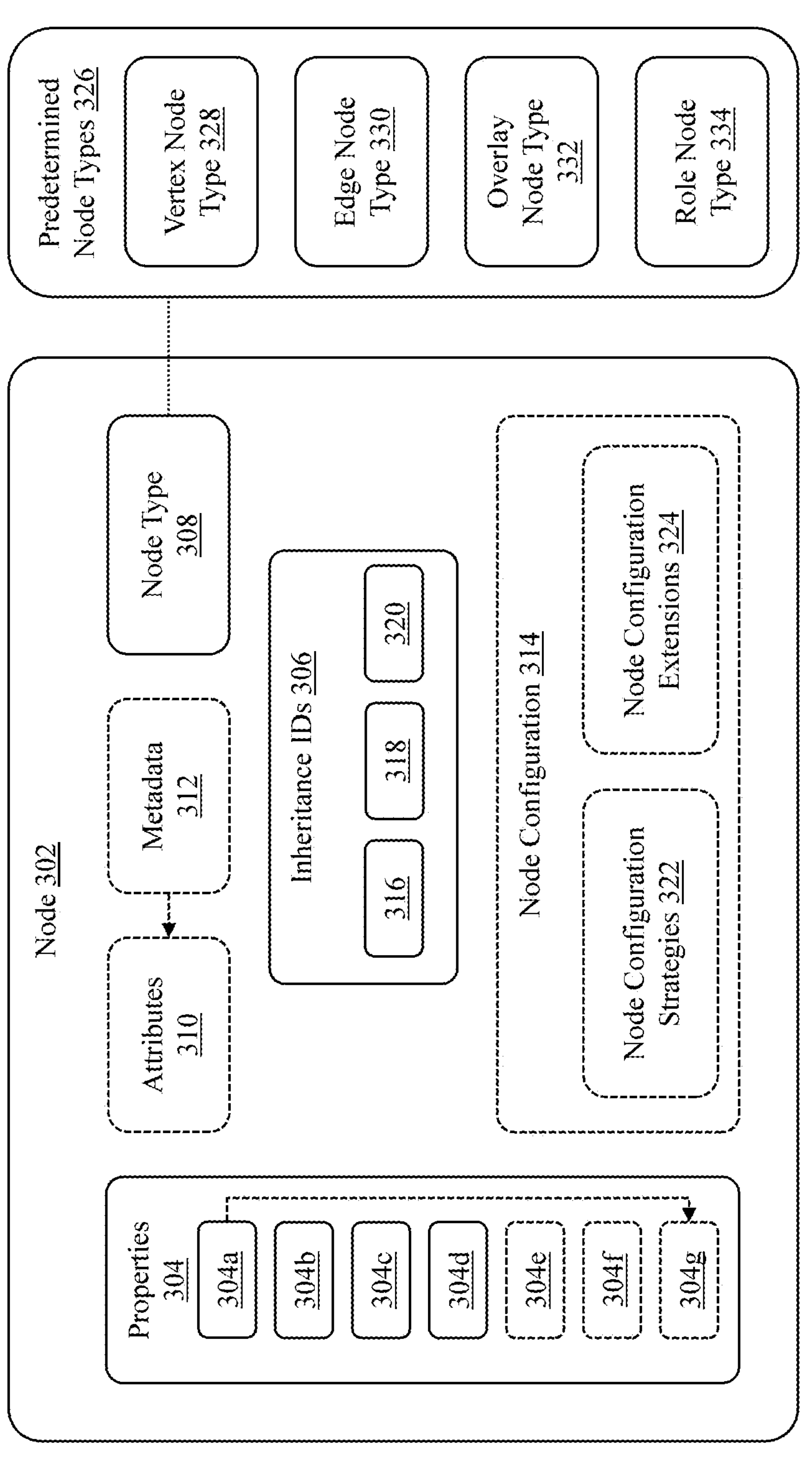
FIG. 3A is a block diagram that illustrates a generic structure of a node within the executable graph-based model, in accordance with an embodiment of the present disclosure.

FIG. 3A is a block diagram 300A that illustrates a generic structure of a node 302 within the executable graph-based model 100, in accordance with an embodiment of the present disclosure. Referring to FIG. 3A, the node 302 corresponds to the core structure of the executable graph-based model 100 and forms the foundational building block for all data and processing logic within the executable graph-based model 100. The node 302 includes properties 304, inheritance IDs 306, and a node type 308. The node 302 optionally includes one or more attributes 310, metadata 312 associated with the attributes 310, and a node configuration 314.

The properties 304 of the node 302 include a unique ID 304*a*, a version ID 304*b*, a namespace 304*c*, and a name 304*d*. The properties 304 optionally include one or more icons 304*e*, one or more labels 304*f*, and one or more alternative IDs 304*g*. The inheritance IDs 306 of the node 302 include an abstract flag 316, a leaf flag 318, and a root flag 320. The node configuration 314 optionally includes one or more node configuration strategies 322 and one or more node configuration extensions 324.

The unique ID 304*a* is unique for each node within the executable graph-based model 100. The unique ID 304*a* is used to register, manage, and reference the node 302 within the system (e.g., the overlay system 202). In some embodiments, the one or more alternative IDs 304*g* are associated with the unique ID 304*a* to help manage communications and connections with external systems (e.g., during configuration, sending stimuli, or receiving outcomes). The version ID 304*b* of the node 302 is incremented when the node 302 undergoes transactional change. This allows the historical changes between versions of the node 302 to be tracked by modules or overlays within the overlay system 202. The namespace 304*c* of the node 302, along with the name 304*d* of the node 302, is used to help organize nodes within the executable graph-based model 100. That is, the node 302 is assigned a unique name 304*d* within the namespace 304*c* such that the name 304*d* of the node 302 need not be unique within the entire executable graph-based model 100, only within the context of the namespace 304*c* to which the node 302 is assigned. The node 302 optionally includes one or more icons 304*e* which are used to provide a visual representation of the node 302 when visualized via a user interface. The one or more icons 304*e* can include icons at different resolutions and display contexts such that the visualization of the node 302 is adapted to different display settings and contexts. The node 302 also optionally includes one or more labels 304*f* which are used to override the name 304*d* when the node 302 is rendered or visualized.

The node 302 supports the concept of inheritance of data and processing logic associated with any other node of the executable graph-based model 100 that is inherited by the node 302. This allows the behavior and functionality of the node 302 to be extended or derived from the inherited node of the executable graph-based model 100. The inheritance IDs 306 of the node 302 indicate the inheritance-based information, which may be applicable to the node 302. The inheritance IDs 306 comprise a set of Boolean flags which identify the inheritance structure of the node 302. The abstract flag 316 allows the node 302 to support the construct of abstraction. When the abstract flag 316 takes a value 'true', the node 302 is flagged as abstract that is to say that it cannot be instantiated or created within an executable graph-based model (e.g., the executable graph-based model 100). Thus, in an instance when the node 302 has the abstract flag 316 set to 'true', the node 302 may only form the foundation of other nodes that inherit therefrom. By default, the abstract flag 316 of the node 302 is set to 'false'. The leaf flag 318 is used to indicate whether any other node may inherit from the node 302. If the leaf flag 318 is set to 'true', then no other node may inherit from the node 302 (but unlike an abstract node, a node with the leaf flag 318 set may be instantiated and created within the executable graph-based model 100). The root flag 320 is used to indicate whether the node 302 inherits from any other node. If the root flag 320 is set to 'true', the node 302 does not inherit from any other node. The node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node type. The node type 308 of the node 302 is used to extend the functionality of the node 302. All nodes within the executable graph-based model 100 comprise a node type that defines additional data structures and implements additional executable functionality. A node type thus includes data structures and functionality that are common across all nodes that share that node type. The composition of a node with a node type therefore improves extensibility by allowing the generation of specialized node functionalities for specific application areas. Such extensibility is not present in prior art graph-based models. As illustrated in FIG. 3A, the node 302 and the node type 308 are one logical unit that is not separated in the context of an executing system at run-time (e.g., in the context of execution of an executable graph-based model).

FIG. 3A further shows the plurality of predetermined node types 326 which provides a non-exhaustive list of node types for the node type 308 associated with the node 302. The plurality of predetermined node types 326 include a vertex node type 328 and an edge node type 330. The vertex node type 328 (also referred to as a data node type or a value node type) includes common data structures and functionality related to the 'things' modeled in the graph (e.g., the data). The edge node type 330 includes common data structures and functionality related to joining two or more nodes. A node having the edge node type 330 may connect two or more nodes and thus the edge node type 330 constructs associations and connections between nodes (for example, objects or 'things') within the executable graph-based model 100. The edge node type 330 is not restricted to the number of nodes that can be associated or connected by a node having the edge node type 330. The data structures and functionality of the edge node type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node types 326 further includes the overlay node type 332 and the role node type 334. As will be described in more detail below, a node with the overlay node type 332 is used to extend the functionality of a node, such as the node 302, to incorporate processing logic. Unlike non-overlay nodes, an overlay node includes processing logic which determines the functionality of the overlay node. The processing logic of an overlay node includes a block of executable code, or instructions, which carries out one or more operations associated with the communication of messages within the executable graph-based model 100. The block of executable code is pre-compiled code, code that requires interpretation at run-time, or a combination of both. Different overlay nodes provide different processing logic to realize different functionality. For example, a tenant overlay node includes processing logic to impose a set of constraint for sharing of resources by a corresponding node of a tenant, where the resources are owned by a different tenant, based on the stimulus 230 received by the overlay system 202. The role node type 334 defines a connective relationship between two nodes, for example, an edge node and a first vertex node. A node with the role node type 334 defines a relationship without expressly defining the first vertex node to which the edge node connects. A number of roles (and thus a number of connections) that an edge node type can have is not limited.

The one or more attributes 310 correspond to the data associated with the node 302 (e.g., the data represented by the node 302 within the executable graph-based model 100 as handled by the data management module 236). Notably, a node in the executable graph-based model 100 that is not associated with data may not have any attributes. The one or more attributes 310 represent a complex data type. Each attribute of the one or more attributes 310 is composed of an attribute behavior. Attribute behavior may be one of a standard attribute behavior, a reference attribute behavior, a derived attribute behavior, and a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the node 302 further includes the metadata 312 (e.g., data stored as a name, a count of processed messages, time when last message was processed, an average processing time required for processing a message, or the like) which is associated with either the node 302 or an attribute (for example, the one or more attributes 310) of the node 302. An attribute within the one or more attributes 310 may either have an independent state or a shared state. That is to say that, an attribute may be a value shared attribute or a non-value shared attribute. An independent attribute has data that is not shared with any other node within the executable graph-based model 100. Conversely, a shared attribute has data that is shared with one or more other nodes within the executable graph-based model 100. For example, if two nodes within the executable graph-based model 100 comprise a shared-data attribute with a value state shared by both nodes, then updating the data (e.g., the value) of this shared attribute will be reflected across both nodes.

The node configuration 314 provides a high degree of configurations for the different elements of the node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304*a* of the node 302, which creates message source IDs. A further example of a concrete node configuration strategy is a versioning strategy, associated with the configuration of the version ID 304*b* of the node 302, which supports major and minor versioning (depending on the type of transactional change incurred by the node 302). The versioning strategy may be adapted to a native filing system of a user device hosting the overlay system 202 or a third-party data storage (for example, Snowflake®, or the like) associated with the overlay system 202.

Figure 3B:
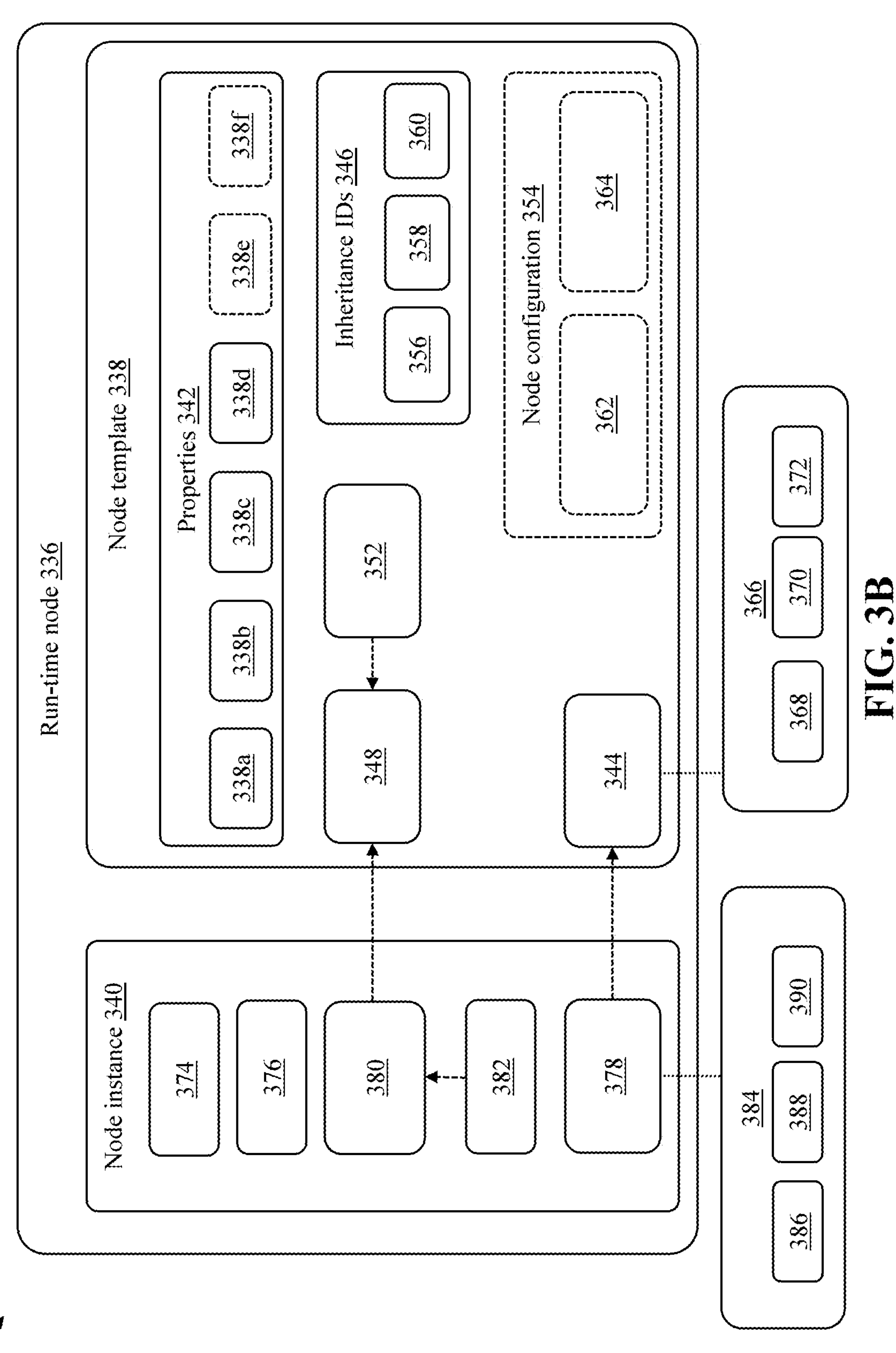
FIG. 3B is a block diagram that illustrates a generic structure of a run-time node within the executable graph-based model, in accordance with an embodiment of the present disclosure.

FIG. 3B is a block diagram 300B that illustrates a generic structure of a run-time node 336 within the executable graph-based model 100, in accordance with an embodiment of the present disclosure. Referring to FIG. 3B, the base run-time node 336 corresponds to the core structure of the executable graph-based model 100 and forms the foundational building block for all data and processing logic within the executable graph-based model 100. The run-time node 336 is shown to include a node template 338 and a node instance 340. The node instance 340 is generated according to the node template 338. The node template 338 forms a data structure for the node instance 340. The run-time node 336 shown in FIG. 3B is a compositional structure that is generated and executed, at run-time as part of the executable graph-based model 100. In other words, the node template 338 is defined 'offline' and the node instance 340 and the run-time node 336 are run-time structures that are dynamically generated during execution of the executable graph-based model 100.

The node template 338 comprises a predetermined node structure. Further, the node template 338 defines one or more rules that govern the generation of the node instance 340. The node instance 340 is an implementation of the node template 338. In other words, the node instance 338 is generated based on the predetermined node structure and the one or more rules of the node template 338. The node template 338 cannot be modified during the execution but may be modified during offline mode or at rest. During execution, only the node instance 340 of the run-time node 336 may be modified.

The node template 338 includes properties 342, a node type template 344, inheritance IDs 346, and a set of attribute templates 348. The node template 338 may optionally include metadata 352 and node configuration 354. The properties 342 of the node template 338 include a unique identifier (ID) 338*a*, a version ID 338*b*, a namespace 338*c*, a name 338*d*, and optionally include one or more icons 338*e* and a set of labels 338*f*. The inheritance IDs 346 comprise an abstract flag 356, a leaf flag 358, and a root flag 360. The node configuration 354 optionally comprises one or more node configuration strategies 362 and/or one or more node configuration extensions 364. FIG. 3B further shows a plurality of predetermined node type templates 366. The plurality of predetermined node type templates 366 include a vertex node type template 368, an edge node type template 370, and an overlay node type template 372. Further, the node instance 340 includes a unique ID 374, a version ID 376, a node type instance 378, and a set of attribute instances 380. The node instance 340 may optionally include metadata 382. FIG. 3B further shows a plurality of predetermined node type instances 384. The plurality of predetermined node type instances 384 include a vertex node type instance 386, an edge node type instance 388, and an overlay node type instance 390.

The unique ID 338*a* is unique for each node template within the executable graph-based model 100. Similarly, the unique ID 374 is unique for each node instance within the executable graph-based model 100. The unique ID 338*a* and the unique ID 374 are used to register, manage, and reference the node template 338 and the node instance 340, respectively, within the overlay system 202. The version ID 338*b* of the node template 338 is incremented when the node template 338 undergoes transactional change. Similarly, the version ID 376 of the node instance 340 is incremented when the node instance 340 undergoes transactional change. The namespace 338*c* of the node template 338, along with the name 308*d* of the node template 338, is used to help organize node templates within the executable graph-based model 100. That is, the node template 338 is assigned a unique name 338*d* within the namespace 338*c* such that the name 338*d* of the node template 338 need not be unique within the entire executable graph-based model 100, only within the context of the namespace 338*c* to which the node template 338 is assigned. The node template 338 optionally comprises one or more icons 338*e* which are used to provide a visual representation of the node template 338. The one or more icons 338*e* can include icons at different resolutions and display contexts such that the visualization of the node is adapted to different display settings and contexts. The node template 338 also optionally comprises the set of labels 338*f* which are used to override the name 338*d* when the node template 338 is rendered or visualized.

The node template 338 supports the software development feature of multiple inheritance by maintaining references (not shown) to zero or more other node templates, which then act as the base of the node template 338. This allows the behavior and functionality of a node template to be extended or derived from one or more other node templates within an executable graph-based model. The node instance 340 likewise supports multiple inheritance because it is an instance representation of the node template 338. The multiple inheritance structure of the node instance 340 is, however, limited to the corresponding instance realization of the multiple inheritance structure defined by the node template 338, i.e., one node instance 340 is created and managed for each node template 338 defined in the inheritance hierarchy for a node instance of a node template.

The inheritance IDs 346 of the node template 338 provide an indication of the inheritance-based information, which is applicable, or can be applicable, to the node template 338. The inheritance IDs 346 has a description that is similar to the inheritance IDs 306. The abstract flag 356 has a description that is similar to the abstract flag 316, the leaf flag 358 has a description that is similar to the leaf flag 318 and the root flag 360 has a description that is similar to the root flag 320.

All elements within the executable graph-based model 100 are defined as node templates or node instances. The functionality of the node template 338 and the node instance 340 are realized due to the use of the node type template 344 and the node type instance 378. The node type template 344 of the node template 338 is used to extend the functionality of the node template 338 by defining the standard set of capabilities, including data and associated behavior. The vertex node type template 368 (also referred to as a data node type) includes a template of common data structures and functionality related to the 'things' modeled in the graph (e.g., the data). The vertex node instance 386 includes the common data structures and functionality related to the 'things' modeled in the graph based on the vertex node type template 368. The edge node type template 370 includes a template of common data structures and functionality related to joining two or more nodes. A node instance having the edge node type instance 388 may connect two or more nodes and thus the edge node type instance 388 constructs associations and connections between nodes (for example objects or 'things') within the executable graph-based model

100. The edge node type instance 388 is not restricted to the number of nodes that can be associated or connected by a node having the edge node type instance 388. The data structures and functionality of the edge node type instance 388 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween. The plurality of predetermined node type templates 366 further includes the overlay node type template 372. The overlay node type template 372 is used to extend the functionality of a node template (e.g., the node template 338) to incorporate processing logic. Similarly, the overlay node type instance 390 is used to extend the functionality of a node instance (e.g., the node instance 340) to incorporate processing logic.

The set of attribute templates 348 corresponds to the data defined by the node template 338. For example, the set of attribute templates 348 may define the names and value types (e.g., integer, string, float, etc.) of one or more attributes but not the values of these attributes. The values of the set of attribute templates 348 may be defined by the set of attribute instances 380 of the node instance 340 through one or more values or instance values. For example, the node template 338 may define a string attribute 'surname' and the corresponding node instance 340 may assign the instance value 'Bell-Richards' to this string attribute. Each attribute instance of the set of attribute instances 380 is associated with an attribute template of the set of attribute templates 348. The node template 338 may define one or more default values for the set of attribute templates 348. The default values correspond to the values that the attributes take if no value is assigned. The metadata 352 (e.g., data stored as a name, value type, and value triplet) is associated with either the node template 338 or one or more of the set of attribute templates 348 of the node template 338. Similarly, the node instance 340 also optionally comprises the metadata 352 (e.g., data stored as a name, value type, and value triplet) which is associated with either the node instance 340 or one or more of the set of attribute instances 380.

The node configuration 354 provides a high degree of configurability for the different elements of a node template and/or a node instance. An example of a concrete node configuration strategy is an ID strategy, associated with the configuration of the unique ID 338*a* of the node template 338. A further example of a concrete node configuration strategy is a versioning strategy, associated with the configuration of the version ID 338*b* of the node template 338 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

It will be apparent to a person skilled in the art that each node of each of the plurality of executable graph-based models has a generic structure that is similar to the node 302 of FIG. 3A or the run-time node 336 of FIG. 3B.

FIG. 4 is a block diagram 400 that illustrates an executable node 402 within the executable graph-based model 100, in accordance with an embodiment of the present disclosure. Referring to FIG. 4, the executable node 402 is shown to include a base node (e.g., the node 302 or the run time node 336) and an overlay manager 404. For the sake of ongoing discussion, the base node corresponds to the node 302, and is hereinafter referred to as the "base node 302". However, the functionality of the executable node 402 for the base node corresponding to the run time node 336 may be similar to that for the base node corresponding to the node 302.

The overlay manager 404 includes a first overlay node 406 and a second overlay node 408. The executable node 402 provides processing functionality (e.g., processing logic) to the base node 302 via one or more associated overlay nodes (for example, the first and second overlay nodes 406 and 408). Beneficially, the data and processing capability of the base node 302 may be dynamically and significantly extended using the concept of an executable node (for example, the executable node 402). As shown, the first overlay node 406 has a first overlay node type 410 and the second overlay node 408 has a second overlay node type 412. One example the overlay node type is a tenant overlay node.

The tenant overlay node is a node that includes a set of constraints for enabling sharing of resources between two or more tenants (for example, an owner tenant and a borrower tenant) of the overlay system 202 and processing logic for enforcing the set of constraints. The tenant overlay node, being a node, adheres to the generic structure of a node described in conjunction with FIG. 3A. The tenant overlay node is associated with a first node of the borrower tenant that shares/uses a second node of the owner tenant. The term "borrower tenant" refers to a tenant of the overlay system 202 that shares/use a node of another tenant of the overlay system 202. The term "owner tenant" refers to a tenant of the overlay system 202 that owns the node being shared/used by the borrower tenant. For the sake ongoing description, it is assumed that the first node of the borrower tenant shares/uses the second node of the owner tenant.

Each node of the overlay system 202 may correspond to one of a data structure associated with corresponding executable graph-based model, data associated with the corresponding executable graph-based model, and processing logic associated with the corresponding executable graph-based model. The tenant overlay node includes the set of constraints that is defined by the owner tenant who owns the second node. The set of constraints is to be adhered to by the first node of the borrower tenant that uses the second node. The set of constraints is indicative of at least one of a group consisting of a data structure sharing policy, a data sharing policy, a processing logic sharing policy, and a process data sharing policy.

The data structure sharing policy defines a first set of rules for sharing a data structure defined by way of the second node. In an example, the first set of rules may be indicative of a first set of allowed operations and a first set of prohibited operations associated with the second node. In another example, the first set of rules may include a time limit for which the second node may be used. The data sharing policy defines a second set of rules for sharing data stored at the second node. In an example, the second set of rules may be indicative of a second set of allowed operations and a second set of prohibited operations associated with the second node. The processing logic sharing policy defines a third set of rules for sharing processing logic defined using the second node. In an example, the third set of rules may be indicative of a third set of allowed operations and a third set of prohibited operations associated with the second node. The process data sharing policy defines a fourth set of rules for sharing process data. The process data is generated based on execution of the processing logic defined using the second node. In an example, the fourth set of rules may be indicative of a fourth set of allowed operations and a fourth set of prohibited operations associated with the second node. Set of allowed operations may include read and write operations, whereas the set of prohibited operations may include write and return operations.

In some embodiments, the set of constraints corresponds to the data structure sharing policy when the second node corresponds to a node template. The data structure sharing policy defines one or more conditions under which the data structure associated with the second node must be used by the first node. In an example, the data structure sharing policy may state that the data structure associated with the second node, when used by the first node, should be read-only. Hence, the first node can read/use the data structure associated with the second node but is prohibited from making any modification to the data structure. In another example, the data structure sharing policy may state that the first node, when using the second node, should be able to read the data as well as write into the data structure of the second node. Hence, the first node can read the data structure associated with the second node as well as make modifications to the data structure. In another example, the data structure sharing policy may state that the first node, when using the second node, should be able to read the data structure, write into the data structure of the second node to cause modification to the data structure, and is required return the modified data structure. Hence, the first node can read the data structure associated with the second node, make modifications to the data structure, and has to communicate with the second node to return the modified data structure.

In some embodiments, the set of constraints corresponds to the data sharing policy when the second node corresponds to a node that has data. The data sharing policy defines one or more conditions under which data associated with the second node must be used by the first node. In an example, the data sharing policy may state that the data associated with the second node, when used by the first node, should be read-only. Hence, the first node can read the data associated with the second node but is prohibited from making any modification to the data. In another example, the data sharing policy may state that the first node, when using the second node, should be able to read the data as well as write into the data of the second node. Hence, the first node can read the data associated with the second node as well as make modifications to the data. In another example, the data sharing policy may state that the first node, when using the second node, should be able to read the data, write into the data of the second node to cause modification to the data, and is required return the modified data. Hence, the first node can read the data associated with the second node, make modifications to the data, and has to communicate with the second node to return the modified data.

In some embodiments, the set of constraints corresponds to the processing logic sharing policy when the second node corresponds to a node that has processing logic (for example, an overlay node). The processing logic sharing policy defines one or more conditions under which processing logic associated with the second node must be used by the first node. In an example, the processing logic sharing policy may state that the processing logic associated with the second node, when used by the first node, should be read-only. Hence, the first node can read, i.e., execute, the processing logic associated with the second node but is prohibited from making any modification (e.g., a write operation) to the processing logic. In another example, the processing logic sharing policy may state that the first node, when using the second node, should be able to read/execute the processing logic as well as write, i.e., make modifications, to the processing logic of the second node. Hence, the first node can read the processing logic associated with the second node as well as make modifications to the processing logic. In another example, the processing logic sharing policy may state that the first node, when using the second node, should be able to read/execute the processing logic, write into the processing logic of the second node to cause one or more change in the processing logic, and is required to return the modified processing logic. Hence, the first node can execute the processing logic associated with the second node, make modifications to the processing logic, and has to communicate with the second node to return the modified processing logic.

In some embodiments, the set of constraints corresponds to the process data sharing policy when the second node corresponds to a node that has process data and/or processing logic (for example, an overlay node). The process data sharing policy defines one or more conditions under which process data associated with the second node must be used by the first node. The process data associated with the second node may refer to data that is generated based on execution of the processing logic associated with the second node. In an example, the process data sharing policy may state that the process data associated with the use of the processing logic of the second node by the first node does not need to be returned to the second node. In such an example, the process data is not returned to the second node. In an example, the process data sharing policy may state that the process data associated with the use of the processing logic of the second node by the first node must be returned. In such an example, the first node communicates with the second node to return the process data to the second node.

In some embodiments, the second node may be associated with corresponding configuration data. The configuration data may define one or more conditions to be met while using the second node. In an example, the second node may include a set of rules and configuration data for the set of rules. A first rule of the set of rules may be a string length rule that defines a permissible range for an attribute value of an attribute of the second node. Therefore, the configuration data associated with the first rule includes a minimum string length and a maximum string length that forms the permissible range. In such embodiments, sharing/use of the configuration data associated with the second node may or may not be allowed by the owner tenant. In an instance, when the configuration data associated with the second node is not shared with the first node, the borrower tenant may define a local configuration data for using the second node.

In some embodiments, the set of constraints may correspond to a combination of the processing logic sharing policy and the process data sharing policy.

In some embodiments, the set of constraints corresponds to a combination of the data structure sharing policy, the data sharing policy, the processing logic sharing policy, and the process data sharing policy.

In some embodiments, the modifications to any of the data structure, the data, the processing logic, and the process data associated with the second node may be confidential. In such embodiments, the confidential data may be anonymized by using obfuscation techniques, encryption techniques, or the like.

To summarize, a sharing type of the sharing of the second node with the first node may be one of (i) a read-only sharing, where the set of constraints enable the first node to access the second node, (ii) a read and write sharing, where the set of constraints enable the first node to access as well as modify the second node, and (iii) a read, write, and return sharing, where the set of constraints enable the first node to access and modify the second node and requires the first node to return the modified second node.

In some embodiments, the data structure, the data, the processing logic, and the process data of the second node may be partially shared with the first node.

Hence, the second node may have a shared portion and an unshared portion. Hence, when the sharing of the second node with the first node is the read-only sharing, the set of constraints enables the first node to access a shared portion of the second node. When the sharing of the second node with the first node is the read and write sharing, the set of constraints enables the first node to access as well as modify the shared portion of the second node. When the sharing of the second node with the first node is the read, write, and return sharing, the set of constraints enables the first node to access and modify the shared portion of the second node and requires the first node to return the modified shared portion to the second node.

In some embodiments, when the sharing is the read, write, and return sharing, the set of constraints requires the first node to return at least one of (i) operational data associated with stimulus processing of a stimulus that is indicative of execution of a set of operations using the first node such that the execution of the set of operations requires the first node to share/use the second node, (ii) an outcome of the execution of the set of operations, and (iii) a set of modifications associated with the second node, where the set of modifications is performed during the execution of the set of operations. In an example, the second node may be an overlay node. Therefore, the first node may return data associated with operation of the overlay system 202 while executing processing logic associated with the second node, output of the execution of the processing logic, and any modification that is done in the processing logic.

Although, the executable node 402 is shown to include the first and second overlay nodes 406 and 408, in other embodiments, the executable node 402 may include any number of overlay nodes, without deviating from the scope of the present disclosure.

The executable node 402 extends the base node 302 (or is a subtype of the base node 302) such that all the functionality and properties of the base node 302 are accessible to the executable node 402. The executable node 402 also dynamically extends the functionality of the base node 302 by associating the overlay nodes maintained by the overlay manager 404 with the base node 302. The executable node 402 may thus be considered a combination of the base node 302 and the first and second overlay nodes 406 and 408. The executable node 402 may be alternatively referred to as a node with overlay(s). Therefore, the executable node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a node type such as a vertex node type, an edge node type, an overlay node type, or the like. Alternatively, the base node 302 may itself be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the first overlay node 406 and the second overlay node 408) associated with the base node 302. The assignment of the first and second overlay nodes 406 and 408 to the base node 302 (via the overlay manager 404) endows the base node 302 with processing logic and executable functionality defined within the first and second overlay nodes 406 and 408.

Extending the functionality of a base node through one or more overlay nodes is at the heart of the overlay system 202. As illustrated in FIG. 2, the data (e.g., a vertex node as represented by the base node 302 in FIG. 4) and the functionality that acts upon that data (e.g., an overlay node) can be separated and independently maintained offline, but at run-time, an association between the data node and the overlay node is determined and an executable node is generated (e.g., the executable node 402 shown in FIG. 4).

It will be apparent to a person skilled in the art that functionalities of the first and second overlay nodes 406 and 408 may be performed by a single overlay node that includes processing logic associated with both of the first and second overlay nodes 406 and 408.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node type of the node to which the overlay node is applied.

An overlay node, such as the first overlay node 406 or the second overlay node 408, is not bound to a single executable node or a single executable graph-based model (unlike nodes that have non-overlay node types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 404 of the executable node 402 is responsible for executing all overlays registered therewith. The overlay manager 404 also coordinates the execution of all associated overlay nodes. As shown in FIG. 4, the executable node 402 associates the base node 302 with two overlay nodes that is the first overlay node 406 and the second overlay node 408. Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

The data and the processing logic associated with one or more overlays of an executable node (for example, the executable node 402) are persistent. The persistent nature of the data and the processing logic are described in detail in conjunction with FIG. 5.

Figure 5:
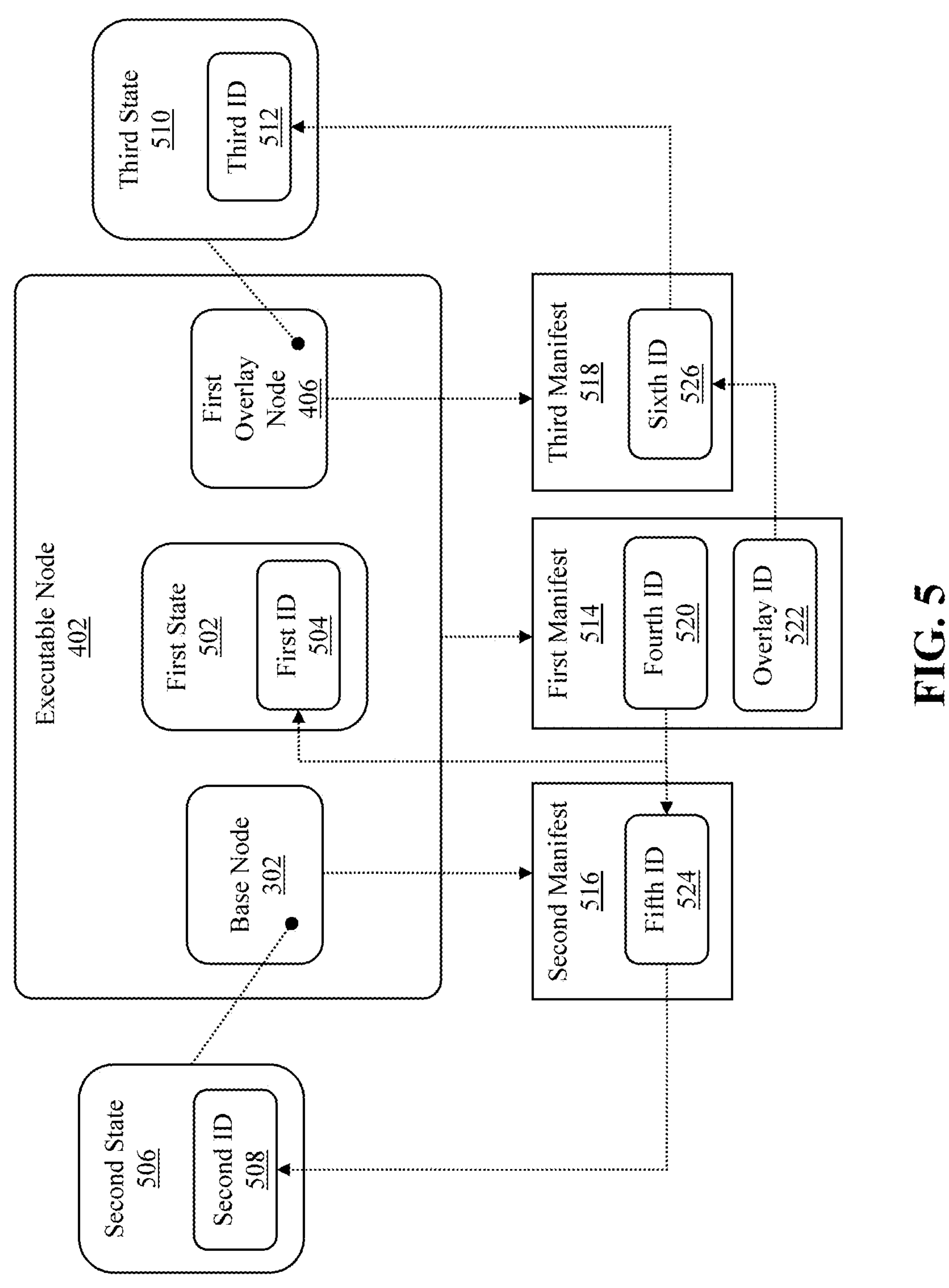
FIG. 5 is a block diagram that illustrates a composition of the executable node that enables persistent storage of data and processing logic associated therewith, in accordance with an embodiment of the present disclosure.

FIG. 5 is a block diagram 500 that illustrates a composition of the executable node 402 that enables persistent storage of data and the processing logic associated therewith, in accordance with an embodiment of the present disclosure.

As described in conjunction with FIG. 4, the executable node 402 includes the base node 302 and one or more overlay nodes (e.g., the first and second overlay nodes 406 and 408). For the brevity of ongoing description, the persistent storage is explained for the executable node 402 including only the first overlay node 406. One or more operations performed for ensuring the persistence of the first overlay node 406 may be performed for the second overlay node 408 as well.

Referring to FIG. 5, the executable node 402 includes the base node 302 and the first overlay node 406. The executable node 402 has a corresponding first state 502 having a first ID 504. The base node 302 has a second state 506 having a second ID 508, and the first overlay node 406 has a third state 510 having a third ID 512. A manifest (for example, first through third manifests 514-518) is generated for each of the base node 302, the executable node 402, and the first overlay node 406. In an embodiment, the manifests may be generated by the storage management module 220. The first manifest 514 is associated with the executable node 402 and has a fourth ID 520 and an overlay ID 522. The second manifest 516 is associated with the base node 302 and has a fifth ID 524. The third manifest 518 is associated with the first overlay node 406 and has a sixth ID 526. Further, the manifests are stored at respective storage locations that may be centralized or distributed storage locations associated with the overlay system 202. The manifests may be stored by the storage management module 220.

The first state 502 of the executable node 402 includes data required to reconstruct the executable node 402 (e.g., attributes, properties, etc.). The first state 502 of the executable node 402 is persistently stored along with the first ID 504. The first manifest 514 is generated for the executable node 402 and has (i) the fourth ID 520 (which is the same as the first ID 504), (ii) the storage location of the first state 502 of the executable node 402, and (iii) the overlay ID 522 (which is the same as the sixth ID 526). Notably, the fourth ID 520 is the same as the first ID 504 and the fifth ID 524, hence, the first manifest 514 includes the ID of the state of the base node 302 and the executable node 402. Further, the overlay ID 522 is the same as the sixth ID 526 of the state of the first overlay node 406. Therefore, the first manifest 514 may be used to identify and retrieve the states of the base node 302, the executable node 402, and the first overlay node 406. Subsequently, the retrieved states may be used to reconstruct the executable node 402 and the first overlay node 406. In an instance, the executable node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has (i) the fifth ID 524 and (ii) the storage location of the second state 506 of the base node 302. The second ID 508 of the second state 506 and the fifth ID 524 of the second manifest 516 are the same as the first ID 504 of the first state 502 of the executable node 402 (which is also the same as the fourth ID 520 of the first manifest 514 of the executable node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable node 402 and the base node 302 include the same, shared, ID. A shared ID can be used in this instance because the states, manifests, and manifest states are stored separately. The separate storage of the states, manifests, and manifest states exhibits a distributed architecture of the overlay system 202.

The third state 510 of the first overlay node 406 includes data required to reconstruct the first overlay node 406 (e.g., attributes, properties, processing logic, etc.) and is persistently stored along with the third ID 512. The third manifest 518 is generated for the first overlay node 406 and includes the sixth ID 526, which is the same as the third ID 512. Therefore, the first manifest 514 may be further used to identify and retrieve the third manifest 518 which in turn may be used to identify and retrieve the third state 510 of the first overlay node 406. A third manifest state (not shown) is then generated for the third manifest 518 and is persistently stored along with the sixth ID 526.

In operation, when the executable node 402 is to be loaded, the transaction module 208, in conjunction with the storage management module 220, may execute one or more operations to retrieve the first manifest state stored at a known storage location. Based on the first manifest state, the storage management module 220 may re-construct the first manifest 514 which includes the fourth ID 520 which is the same as the fifth ID 524 of the second manifest 516. Based on the fifth ID 524, the storage management module 220 may identify the second manifest state and may generate the second manifest 516 based on which the second state 506 is identified. Subsequently, the base node 302 is loaded and the storage management module 220 may determine that the base node is a node with overlay. Based on the fourth ID 520 (that is the same as the first ID 504 of the first state 502 of the executable node 402) of the first manifest 514, the first state 502 is identified and retrieved. Subsequently, the executable node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the first overlay node 406 is reconstructed and loaded in the executable graph-based model 100.

In some embodiments, the first overlay node 406 may not be loaded in case it is not required for executing the operation associated with the stimulus 230. The loaded executable node 402 and the first overlay node 406 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, all manifest states are stored together at a storage location that is known to the storage management module 220. Such centralized storage of the manifest states ensures that node states associated therewith are easily accessible.

It will be apparent to a person skilled in the art that although FIG. 5 illustrates only a single overlay node, in other embodiments, the executable node may include additional or different overlay nodes (for example, the second overlay node 408). It will also be apparent to a person skilled in the art that only those overlay nodes that are required for responding to the stimulus 230 may be loaded.

The overlay system 202 described above may be used to implement systems and methods for facilitating in-situ tenancy in the plurality of executable graph-based models 203.

Figure 6:
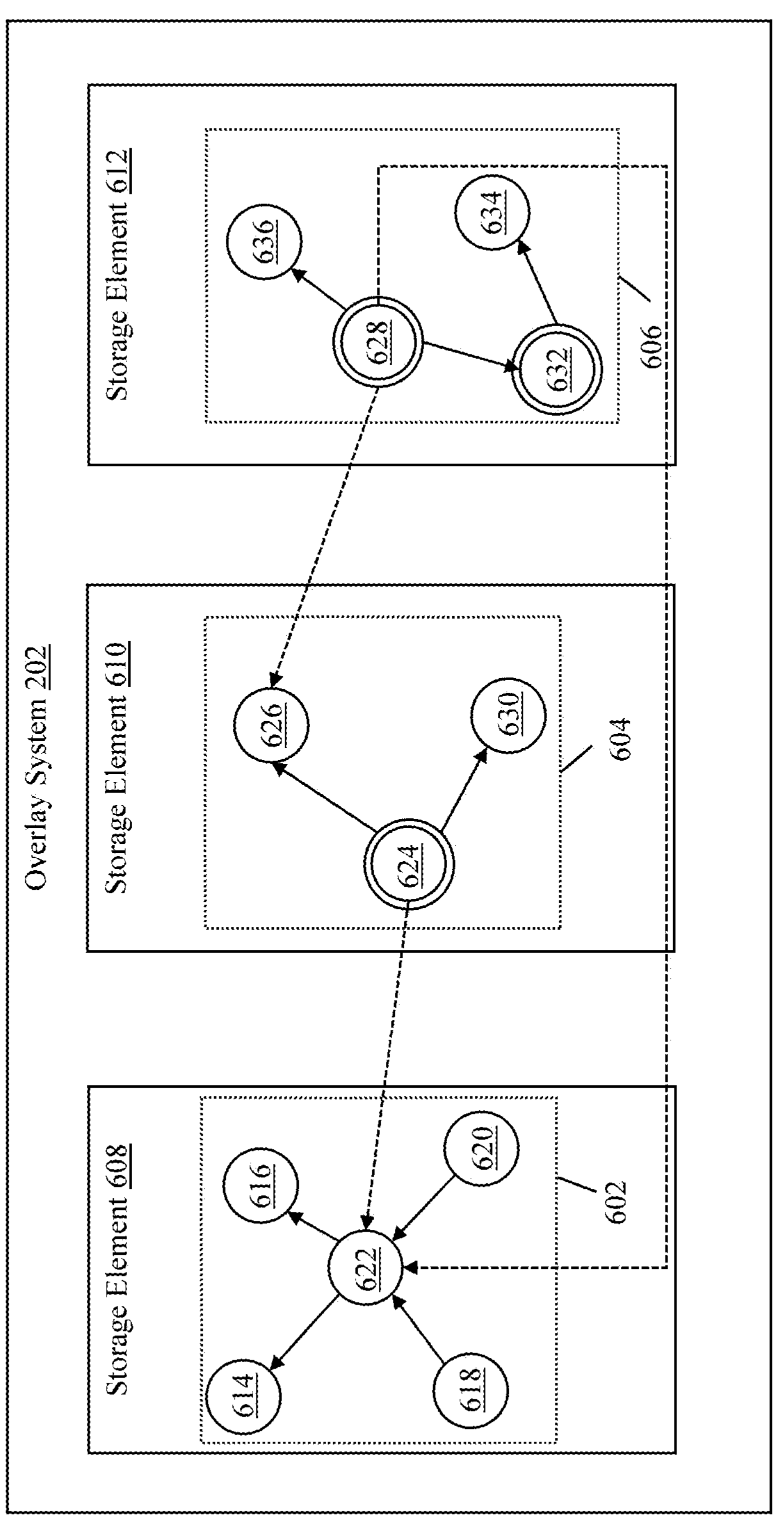
FIG. 6 is a graph that illustrates an implementation of the overlay system, in accordance with an embodiment of the present disclosure.

FIG. 6 is a graph 600 that illustrates an implementation of the overlay system 202, in accordance with an embodiment of the present disclosure. Referring to FIG. 6, the plurality of executable graph-based models 203 are shown to include executable graph-based models 602, 604, and 606. Further, as mentioned previously, the plurality of executable graph-based models 203 are stored in the plurality of storage elements associated with the overlay system 202. That is to say that, each of the plurality of executable graph-based models 203 is stored at a corresponding storage element that is exclusive and non-shared. As shown, the executable graph-based models 602, 604, and 606 are stored in storage elements 608, 610, and 612, respectively. Notably, the executable graph-based model 602 and the storage element 608 are associated with a first tenant (for example, a tenant A shown in FIG. 7) of the overlay system 202, the executable graph-based model 604 and the storage element 610 are associated with a second tenant (for example, a tenant B shown in FIG. 7) of the overlay system 202, and the executable graph-based model 606 and the storage element 612 are associated with a third tenant (for example, a tenant C shown in FIG. 7) of the overlay system 202.

The executable graph-based model 602 is shown to include node templates 614, 616, 618, 620, and 622. The node template 622 inherits from the node templates 614 and 616 whereas node templates 618 and 620 inherit from the node template 622. The executable graph-based model 604 is shown to include a node instance 624, and an overlay node 626 of the node instance 624. The executable graph-based model 606 is shown to include a node 628.

The node instance 624 is an instance of the node template 622. Therefore, the node instance 624 shares/uses the node template 622. In operation, a first stimulus (for example, the stimulus 230) may be received by the overlay system 202. A context of the first stimulus is matched with the set of defined contexts. The first stimulus is processed when the context of the first stimulus matches with one of the set of defined contexts. Further, the first stimulus may be indicative of an instruction to share the node template 622 with the executable graph-based model 604. The processing circuitry (for example, the tenant management module 242) may be configured to create a sharing channel (not shown) between the storage element 608 and the storage element 610. The sharing channel acts as a medium between the storage elements 608 and 610. The sharing channel is used by the executable graph-based model 604 to share the node template 622. Based on such sharing of the node template 622, the node instance 624 is instantiated as an instance of the node template 622. Further, the node instance 624 is extended by way of a tenant overlay node 630 that includes a set of constraints to be adhered to by the node instance 624 while using the node template 622. In some embodiments, the sharing channel may be exclusive for sharing the node template 622 with the executable graph-based models 604. In some embodiments, the sharing channel may be further used for sharing one or more other nodes of the executable graph-based model 602 with the executable graph-based model 604. Also, the sharing channel is a unidirectional communication medium. In an instance, when a node of the executable graph-based model 604 is to be shared with the executable graph-based model 602 another sharing channel needs to be created between the executable graph-based models 602 and 604 that enable sharing of the node of the executable graph-based model 604 with executable graph-based model 602.

In some embodiments, each node of each executable graph-based model may be associated with corresponding metadata that is indicative of corresponding sharing criteria. The sharing criteria of each node defines one or more rules for sharing the node. The one or more rules define a sharing type (e.g., a read-only sharing, a read and write sharing, a read, write, and return sharing, or the like) that is allowed by corresponding tenant. The tenant management module 242 may be configured to determine the set of constraints for use of each node based on the one or more rules defined by the corresponding sharing criteria. For example, metadata associated with the node template 622 may be indicative of a sharing criteria that corresponds to 'no modifications' (e.g., the node template 622 is not to be modified by any tenant while sharing). That is to say that the sharing criteria defines a rule that data structure associated with the node template 622 is not to be modified while sharing. Therefore, the set of constraints included in the tenant overlay node 630 allow for sharing/use of the node template 622 but prohibits any modifications therein. Hence, the sharing of the node template 622 is the read-only sharing.

In some embodiments, the sharing of the node template 622 may be the read, write, and return sharing. Hence, the node instance 624 that is sharing and using the node template 622 may also make modifications to data structure defined by way of the node template 622. Such modification may be made by the node instance 624 based on a second stimulus (for example, the stimulus 230). The second stimulus may be indicative of execution of a set of operations to be executed using the node instance 624 such the execution of the set of operations makes one or more modifications to the node template 622. Hence, stimulus processing of the second stimulus requires the node instance 624 to share the node template 622. Further, the node instance 624 has to return (i) operational data associated with stimulus processing of the second stimulus, (ii) an outcome of the execution of the set of operations, and/or (iii) a set of modifications associated with the node template 622. The operational data may refer to data associated with operations of one or more components and/or modules of the overlay system 202 while executing the second stimulus. The outcome of the execution may be a modified version of the node template 622, and a set of modifications associated with the node template 622 may include one or more portions of the node template 622 that have been modified. Since, a node being shared is the node template 622 that includes data structure, a node sharing policy for sharing the node template 622 is data structure sharing policy.

Similarly, when a shared node is a node that has data (e.g., a vertex node), the outcome of the execution of the set of operation may include an output of the set of operations performed using the data of the node, and the set of modifications may include an updated/modified portion of the data in case the data gets modified during the execution of the set of operations. Further, since the node being shared is the node that has data, a node sharing policy for sharing the node is data sharing policy.

In some embodiments, the outcome of the execution of the set of operations may include sensitive and/or confidential data. In such embodiments, the node instance 624 may encrypt, obfuscate, or anonymize the sensitive and/or confidential data using one or more techniques known in the art.

The processing circuitry (for example, the tenant management module 242) may be further configured to create a feedback channel between the storage elements 608 and 610. The feedback channel may be used by the node instance 624 for returning the operational data, the outcome, and/or the set of modifications. The feedback channel may be a one-way communication channel between the node instance 624 and the node template 622. In some embodiments, when another node of the executable graph-based model 602 is shared with the executable graph-based model 604, another feedback channel is created between the executable graph-based models 602 and 604 that enable communication of for returning operational data, an outcome, and/or a set of modifications the node of the executable graph-based model 604 with executable graph-based model 602. In some embodiments, a feedback channel may be shared by nodes of an executable graph-based model when each node shares one or more nodes of another executable graph-based model. That is to say that, each node of the executable graph-based model may use the feedback channel to communicate with the another executable graph-based model.

Similarly, the executable graph-based model 606 may include a node 628 (e.g., a data node) that may require to share the overlay node 626 of the executable graph-based model 604. Therefore, a tenant associated with the executable graph-based model 606 may initiate a third stimulus (for example, the stimulus 230) that is indicative of an instruction to share the overlay node 626 with the node 628. Based on the third stimulus, the tenant management module 242 may instantiate a tenant overlay node 632 that is associated with the node 628. The tenant overlay node 632 may include a set of constraints that is to be adhered to by the node 628 while using the overlay node 626. In some instances, the tenant associated with the executable graph-based model 604 and/or the tenant associated with the executable graph-based model 606 may require to apply a set of additional constraints to the use of the overlay node 626 by the node 628. In such instances, the processing circuitry (for example, the overlay management module 216, the tenant management module 242, and/or any other module of the overlay system 202) may be configured to instantiate a custom overlay node 634 as an overlay node of the tenant overlay node 632.

The custom overlay node 634 may include a set of additional constraints that is to be adhered to while the overlay node 626 is being used by the node 628. The set of additional constraints applies further restrictions or limitations to the set of constraints of the tenant overlay node 632. Examples of the custom overlay node include, but are not limited to, a user overlay node, a role overlay node, a location overlay node, or the like. The user overlay node includes (i) a set of additional constraints that defines one or more users that are allowed to use the overlay node 626 by way of the node 628 and (ii) processing logic to apply the set of additional constraints. The role overlay node includes (i) a set of additional constraints that defines one or more user roles (for example, administrator, employee, auditor, or the like) for which the set of constraints defined by the tenant overlay node 632 is to be applied for using the overlay node 626 and (ii) processing logic to apply the set of additional constraints. The one or more user roles refer to designations associated with one or more users of the executable graph-based model 606, where the designations are indicative of the rights and hierarchical positions of the users in the executable graph-based model 606. The location overlay node includes (i) a set of additional constraints that defines one or more storage locations where an outcome, a set of modifications, operational data, or the like, associated with use of the overlay node 626 by way of the node 628 must be stored and (ii) processing logic to apply the set of additional constraints.

Subsequently, the processing circuitry (for example, the tenant management module 242) may create another sharing channel between the node 628 and the overlay node 626. In an instance, when the sharing type of the overlay node 626 with the node 628 is read, write, and return sharing, the processing circuitry (for example, the tenant management module 242) may further create a feedback channel (not shown) between the node 628 and the overlay node 626. In an embodiment, the feedback channel may be created between the node instance 624 and the node 628, where the node instance 624 logically includes the overlay node 626.

It will be apparent to a person skilled in the art that the set of constraints, a sharing type, a sharing policy, or the like, for the sharing of the overlay node 626 with the node 628 may be determined as explained previously in conjunction with the sharing of the node template 622 with the node instance 624.

The sharing of the node template 622 with the node instance 624 and the sharing of the overlay node 626 with the node 628 forms a hierarchical structure of sharing where the executable graph-based model 604 uses one or more resources (e.g., nodes) owned by the executable graph-based model 602, and the executable graph-based model 606 uses one or more resources (e.g., nodes) owned by the executable graph-based model 604.

In an embodiment, the node 628 may further share the node template 622 of the executable graph-based model 602. In such an embodiment, the node 628 may be an instance of the node template 622. Such sharing of the node template 622 by the node instance 624 and the node 628 forms a scenario where the node template 622 of the executable graph-based model 602 is shared with nodes of multiple executable graph-based models (for example, the executable graph-based models 604 and 606). Further, the node 628 shares the node template 622 of the executable graph-based model 602 and the overlay node 626 of the executable graph-based model 604. Hence, such sharing of the node template 622 and the overlay node 626 with the node 628 forms a scenario where nodes of two or more executable graph-based models (for example, the executable graph-based models 602 and 604) are shared with a node of one executable graph-based model (for example, the executable graph-based model 606).

In an instance, the set of constraints to be adhered to by the node 628 while sharing the overlay node 626 is to be further adhered to by the node 628 while sharing the node template 622. In another instance, the set of constraints to be adhered to by the node 628 while using the overlay node 626 is different from a set of constraints to be adhered to by the node 628 while using the node template 622. In such an instance, another tenant overlay node 636 that includes a different set of constraints that is to be adhered to by the node 628 while using the node template 622 is instantiated as an overlay of the node 628.

The processing circuitry (for example, the tenant management module 242) may be further configured to create sharing channels and feedback channels as described in conjunction with the sharing of the node template 622 with the node instance 624. It will be apparent to a person skilled in the art that sharing of one node with another node is performed as described in conjunction with the sharing of the node template 622 with the node instance 624.

In an instance, the overlay system 202 may receive a fourth stimulus that is indicative of a set of operations using the node 628 such that the execution of the set of operations requires the node 628 to share/use the overlay node 626. Based on a context of the fourth stimulus, the stimuli management module 212 may be configured to map the fourth stimulus with the executable graph-based model 606 that includes the node 628. Subsequently, the stimuli management module 212 may be configured to map the fourth stimulus with the node 628 of the executable graph-based model 606. The memory management module 218 along with the storage management module 220 may load the node 628 with corresponding processing logic and data, when the node 628 is not loaded in the executable graph-based model 606. Subsequently, based on the loading of the node 628, the overlay node 626 that is shared by the node 628 also gets loaded with corresponding processing logic and data. Once the node 628 and the overlay node 626 gets loaded with corresponding processing logic and data, the controller module 206 may be configured to use the node 628 and the overlay node 626 to execute the set of operations for performing stimulus processing of the fourth stimulus. The set of operations is executed in accordance with the set of constraints to be adhered to while using the overlay node 626.

Having discussed sharing of nodes (resources) of the plurality of executable graph-based models 203 among the associated tenants, the description now moves towards a concept of creation of sharing channels and the feedback channels among the plurality of executable graph-based models 203 that are sharing resources.

Figure 7:
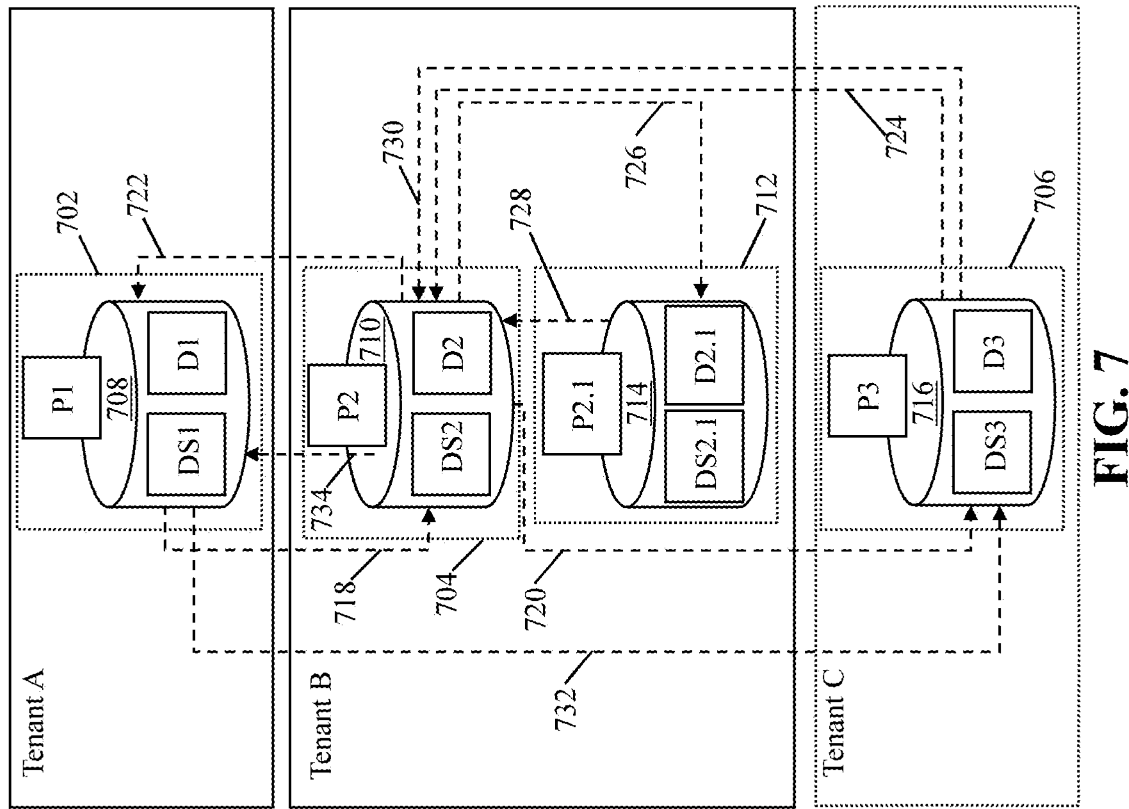
FIG. 7 is a schematic diagram that illustrates an exemplary scenario for creation of sharing channels and feedback channels, in accordance with an embodiment of the present disclosure.

FIG. 7 is a schematic diagram 700 that illustrates an exemplary scenario for creation of sharing channels and feedback channels, in accordance with an embodiment of the present disclosure. Referring to FIG. 7, illustrated is the schematic diagram 700 that presents executable graph-based models 702, 704, and 706 associated with the tenants A, B, and C, respectively.

The executable graph-based model 702 is shown to be implemented by way of a storage element 708. The executable graph-based model 702 includes processing logic P1, data structure DS1, and data D1 that are stored at the storage element 708. Similarly, the executable graph-based model 704 is shown to be implemented by way of a storage element 710. The executable graph-based model 704 includes processing logic P2, data structure DS2, and data D2 that are stored at the storage element 710. The tenant B associated with the executable graph-based model 704 has a sub-tenant that is implemented using resources of the overlay system 202 that is associated with the executable graph-based model 704. The sub-tenant is associated with an executable graph-based model 712 that is stored at the storage element 714. The executable graph-based model 712 includes processing logic P2.1, data structure DS2.1, and data D2.1. The executable graph-based model 712 shares a parent-child relationship with the executable graph-based model 704, in that the executable graph-based model 704 acts as a parent to the executable graph-based model 712. The executable graph-based model 706 is shown to be stored at a storage element 716. The executable graph-based model 706 includes processing logic P3, data structure DS3, and data D3 that are stored at the storage element 716.

In an instance, the executable graph-based model 704 may share a resource of the executable graph-based model 702. Therefore, the tenant management module 242 may create a sharing channel 718 that acts as a medium between the storage elements 708 and 710 and facilitates sharing of resources stored at the storage element 708 with the executable graph-based model 704. The executable graph-based model 706 may use a resource owned by the executable graph-based model 704. Therefore, the tenant management module 242 may create a sharing channel 720 that acts as a medium between the storage elements 710 and 716 and facilitates sharing of resources stored at the storage element 710 with the executable graph-based model 706.

When the sharing of the resources is the read, write, and return sharing, the processing circuitry (for example, the tenant management module 242) may be further configured to create a feedback channel 722 between the executable graph-based models 704 and 702, and another feedback channel 724 between the executable graph-based models 706 and 704. The feedback channel 722 may be used by the executable graph-based model 704 to return data associated with the use of resources of the executable graph-based model 702. The feedback channel 724 may be used by the executable graph-based model 706 to return data associated with the use of resources of the executable graph-based model 704. This forms a hierarchical sharing architecture.

The executable graph-based model 712 may share a resource of the executable graph-based model 702. Since, the executable graph-based model 712 is a child of the executable graph-based model 704, the executable graph-based model 712 may not have a direct association with the executable graph-based model 702. Therefore, the executable graph-based model 712 has to share the resource of the executable graph-based model 702 via the sharing channel 718 that acts as the medium between the executable graph-based models 704 and 702. The tenant management module 242 creates a sharing channel 726 between the executable graph-based models 704 and 712. The executable graph-based model 712 may use one or more resources of the executable graph based-model 702 by using the sharing channels 718 and 726. The executable graph-based model 712 is required to adhere to a set of constraints that is to be adhered to by the executable graph-based model 704 while sharing the resources of the executable graph-based model 702. The executable graph-based model 712 is required to further adhere to another set of constraints defined by the tenant B while using resources of the executable graph-based model 702 via the executable graph-based model 704. When the sharing of resources by the executable graph-based model 712 is read, write, and return sharing, the tenant management module 242 may create a feedback channel 728 between the executable graph-based models 704 and 712. The executable graph-based model 712 may communicate data associated with use of the shared resources to the executable graph-based model 702 via the feedback channels 728 and 722.

In some embodiments, two or more nodes of one executable graph-based model may be shared with one or more nodes of another executable graph-based model via a single sharing channel. Similarly, the data associated with use of the shared nodes may be communicated via a single feedback channel.

In some embodiments, two or more nodes of one executable graph-based model may be shared with one or more nodes of another executable graph-based model via separate sharing channels. Similarly, the data associated with the resource use may be communicated via separate feedback channels.

As shown, the executable graph-based model 704 shares resources of the executable graph-based models 702 and 706. The sharing channel 718 between the storage elements 708 and 710, and a sharing channel 730 between the storage elements 716 and 710 creates a scenario when resources of multiple executable graph-based models (for example, the executable graph-based models 702 and 706) are shared and used by a single executable graph-based model 704. Similarly, one or more resources of the executable graph-based model 702 are shared with the executable graph-based models 704 and 706 via the sharing channel 718 and a sharing channel 732, respectively. The sharing channel 732 between the storage elements 708 and 716 facilitates sharing of the resources of the executable graph-based model 702 with the executable graph-based model 706. This creates a scenario when resources of a single executable graph-based model (for example, the executable graph-based model 702) is shared and used by a plurality of executable graph-based models (for example, the executable graph-based models 704 and 706).

It is assumed that the sharing of resources of the executable graph-based model 702 with the executable graph-based model 706 is read-only sharing or read and write sharing. Therefore, a feedback channel between the executable graph-based model 702 and 706 is not required as no information is sent back to an owner of the resource i.e., the tenant A.

Further, one or more resources of the executable graph-based model 704 is shared with the executable graph-based model 702 via a sharing channel 734. This forms a circular sharing between the executable graph-based models 702 and 704 via corresponding sharing channels. It is assumed that the sharing of resources of the executable graph-based model 704 with the executable graph-based model 702 is read-only sharing or read and write sharing. Therefore, a feedback channel, for sharing data associated with use of resource of the executable graph-based model 704 by the executable graph-based model 702 is not required as no information is to be sent back to an owner of the resource i.e., the tenant B.

Figure 8:
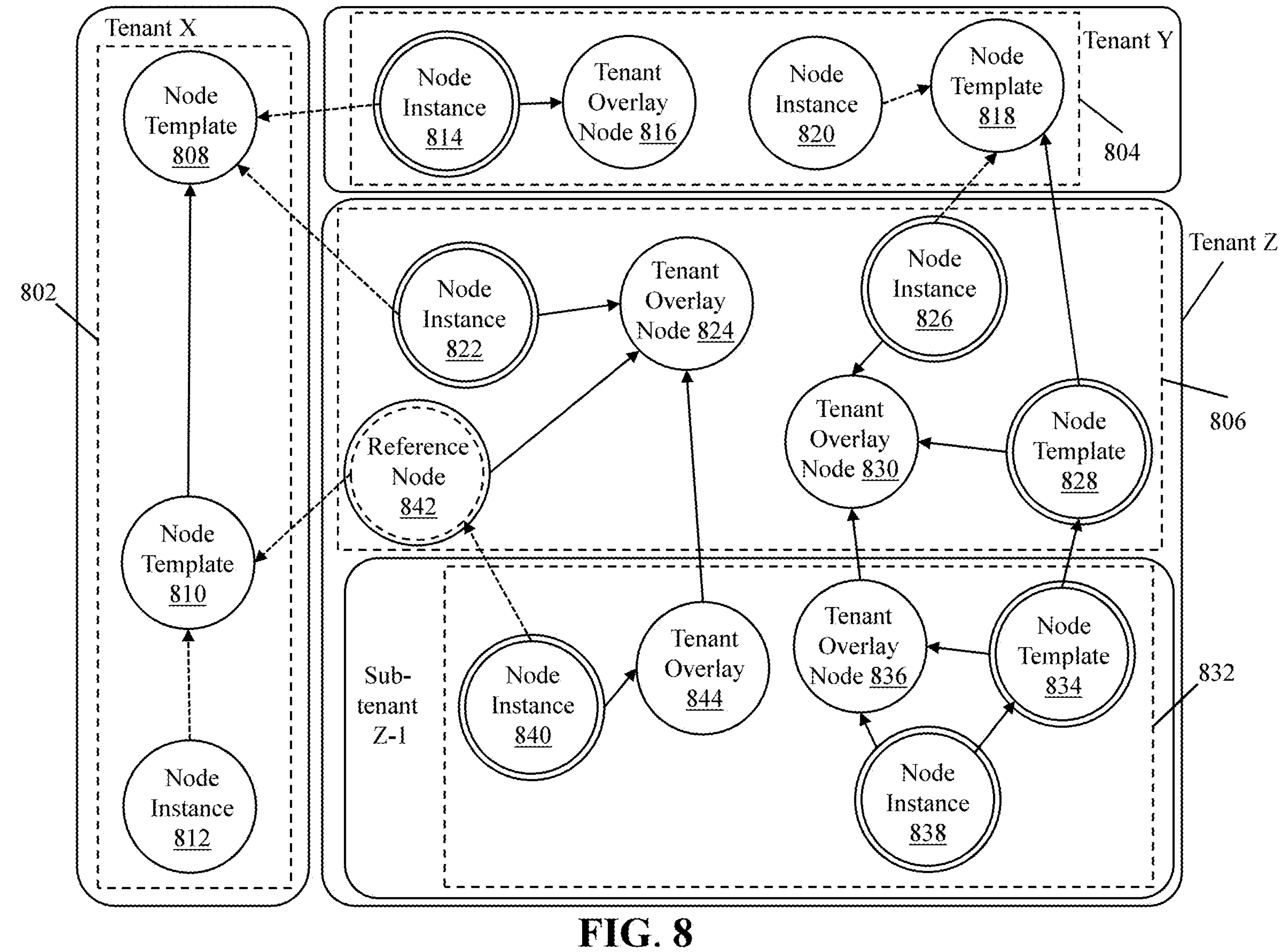
FIG. 8 is a schematic diagram that illustrates an exemplary scenario for sharing of resources among the plurality of executable graph-based models of the overlay system, in accordance with an embodiment of the present disclosure.

FIG. 8 is a schematic diagram 800 that illustrates an exemplary scenario for the sharing of resources among the plurality of executable graph-based models 203 of the overlay system 202, in accordance with an embodiment of the present disclosure. Referring to FIG. 8, the plurality of executable graph-based models 203 is shown to include executable graph-based models 802, 804, and 806 that are associated with tenants X, Y, and Z, respectively, of the overlay system 202.

The tenants X, Y, and Z have corresponding resources implemented by way of the executable graph-based models 802, 804, and 806, respectively. Further, each tenant may require to use one or more resources that is owned by another tenant. Therefore, sharing of resources among the executable graph-based models 802, 804, and 806 is required.

The executable graph-based model 802 is shown to include a node template 808 that is inherited by another node template 810 of the executable graph-based model 802. Further, the executable graph-based model 802 includes a node instance 812 that is an instance of the node template 810.

The executable graph-based model 804 is shown to include a node instance 814 that is an instance of the node template 808. Hence, the executable graph based-model 804 shares the node template 808 of the executable graph-based model 802. Further, the node instance 814 is extended by way of a tenant overlay node 816 that includes a set of constraints that is to be adhered to while the node template 808 is shared by the executable graph-based model 804 by way of the node instance 814. Further, the executable graph-based model 804 includes a node template 818 and a node instance 820 that is an instance of the node template 818.

The executable graph-based model 806 includes a node instance 822 that is an instance of the node template 808. Therefore, the executable graph-based model 806 shares a resource (e.g., data structure) of the executable graph-based model 802. Hence, the node instance 822 is extended by way of a tenant overlay node 824 that includes a set of constraints to be adhered to by the node instance 822 while sharing/using the node template 808. The executable graph-based model 806 further includes a node instance 826 and a node template 828. The node instance 826 is an instance of the node template 818 and the node template 828 inherits from the node template 818. Therefore, the node instance 826 and the node template 828 share/use the node template 818 of the executable graph-based model 804. It is assumed that while sharing/using the node template 818, the node instance 826 and the node template 828 are required to adhere to a same set of constraints. Therefore, the node instance 826 and the node template 828 are linked to the same tenant overlay node (for example, a tenant overlay node 830). The scope of the present disclosure is however not limited to it, and in instances where the set of constraints to be adhered to by the node instance 826 and the node template 828 are different, the node instance 826 and the node template 828 may be linked to different tenant overlay nodes.

The tenant Z has a child that is a sub-tenant Z-1. Therefore, the executable graph-based model 806 has a child that is an executable graph-based model 832. As shown, the executable graph-based model 832 includes a node template 834 that shares/uses the node template 828. In other words, the node template 834 inherits from the node template 828. Therefore, the node template 834 is associated with a tenant overlay node 836 that includes a set of cumulative constraints to be adhered to by the node template 834 while sharing the node template 828. The set of cumulative constraints included in the tenant overlay node 836 refers to a union of (i) the set of constraints included in the tenant overlay node 830 and (ii) another set of constraints defined by the tenant Z to be adhered to by the sub-tenant Z-1 while using one or more resources owned by the tenant Z. The executable graph-based model 832 further includes a node instance 838 that is an instance of the node template 834. The node instance 838 has a data structure that is defined by the node template 834 while using the node template 828. Hence, the node instance 838 is associated with the tenant overlay node 836 as the node instance 838 is instantiated using data structure defined in the node template 828. Therefore, the node instance 838 is required to adhere to the set of cumulative constraints included in the tenant overlay node 836 for using the node template 828.

The executable graph-based model 832 may further include a node instance 840 which is a node instance of the node template 810. Hence, the executable graph-based model 832 shares/uses the node template 810 of the executable graph-based model 802. Since the executable graph-based model 832 is the child of the executable graph-based model 806, therefore, the executable graph-based model 832 shares the node template 810 via the executable graph-based model 806. As shown, a reference node 842 of the node template 810 is created in the executable graph-based model 806. The reference node 842 points to the node template 810. The reference node 842 acts as a placeholder for the node template 810 in the executable graph-based model 806. In other words, the executable graph-based model 806 shares/uses the node template 810. Hence, the reference node 842 is required to follow a set of constraints while using the node template 810. In an instance, the set of constraints to be adhered to by the reference node 842 may be same as the set of constraints to be adhered to by the node instance 822 while using the node template 808. Therefore, the reference node 842 is associated with the tenant overlay node 824. The reference node 842 is used by the executable graph-based model 832 to instantiate the node instance 840. The node instance 840 is required to adhere to the set of constraints to be adhered to by the reference node 842 while sharing the node template 810. Therefore, a tenant overlay node 844 that inherits from the tenant overlay node 824 is instantiated in the executable graph-based model 832 and is associated with the node instance 840. The tenant overlay node 844 may further include a set of cumulative constraints defined by the tenant Z to be adhered to while using the reference node 842. The set of cumulative constraints is a union of set of constraints included in the tenant overlay node 824 and another set of constraints defined by tenant Z for using the reference node 842. Data associated with the use of the node template 810 is communicated by the node instance 840 to the reference node 842 and the reference node 842 in turn communicates the data to the node template 810.

Therefore, each of the tenants X, Y, and Z as well as the sub-tenant Z-1 is able to share resources owned by other tenants associated with the overlay system 202 without compromising on security and corresponding sovereign identity i.e., logical and physical separation from other tenants. Such separation is crucial as it allows each tenant to integrate customized security solutions and other technologies into owned resources.

It will be apparent to a person skilled in the art that the scenario shown in FIG. 8 is exemplary and does not limit the scope of the disclosure.

Figure 9:
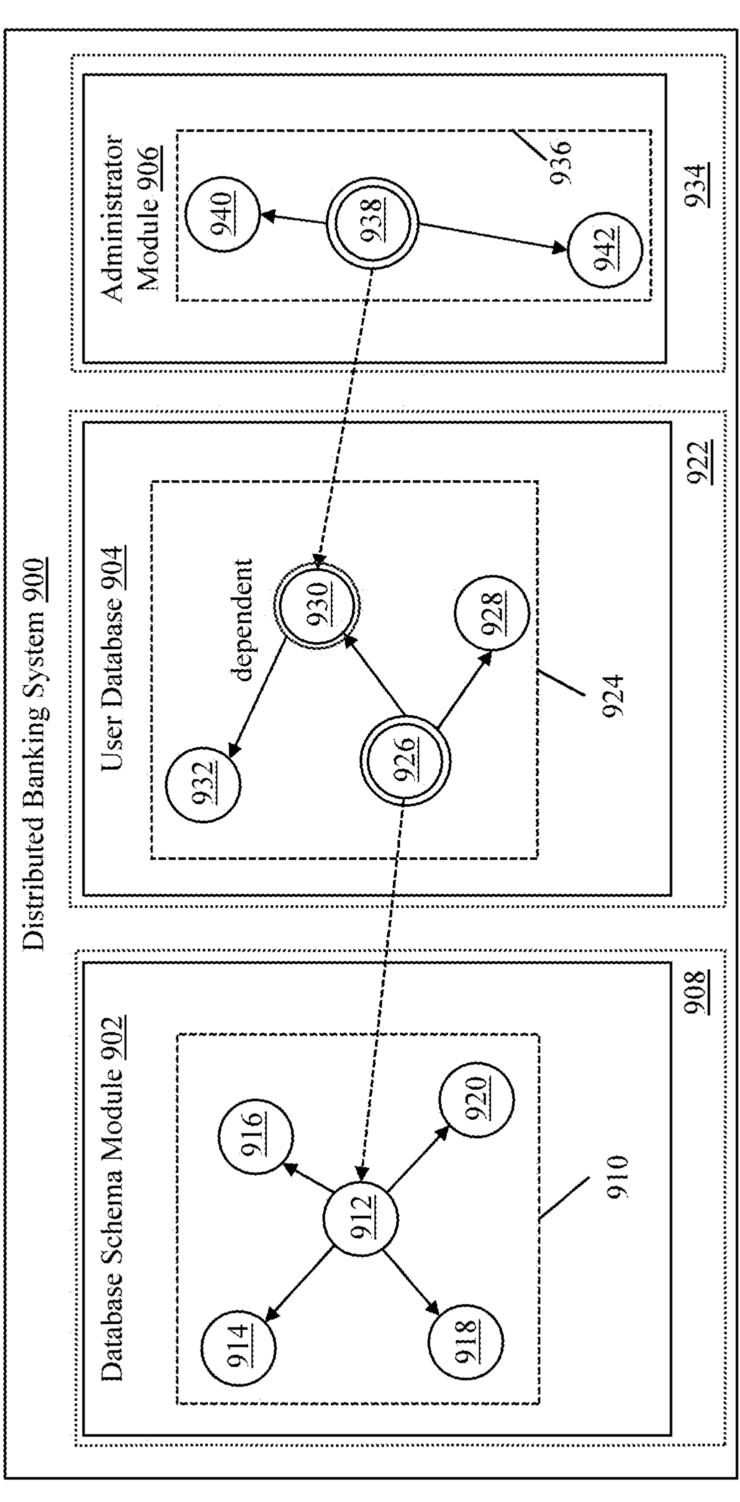
FIG. 9 is a schematic diagram that illustrates an exemplary implementation of the overlay system, in accordance with an embodiment of the present disclosure.

FIG. 9 is a schematic diagram that illustrates an exemplary implementation of the overlay system 202, in accordance with an embodiment of the present disclosure. Referring to FIG. 9, shown is a distributed banking system 900 that includes a database schema module 902, a user database 904, and an administrator module 906.

The database schema module 902 defines data structure associated with the distributed banking system 900. The user database 904 and the administrator module 906 adhere to the data structure defined by the database schema module 902. Hence, the user database 904 and the administrator module 906 use the data structure owned by the database schema module 902. Also, the user database 904 and the administrator module 906 have data and processing logic required for maintaining and processing financial records of users of the distributed banking system 900.

Hence, the user database 904 and the administrator module 906 may also require to share resources with each other to ensure optimal performance of the distributed banking system 900.

The database schema module 902 is stored in a storage element 908. The database schema module 902 is implemented by way of a database schema model 910 (e.g., an executable graph-based model). The database schema model 910 includes node templates 912, 914, 916, 918, and 920. In an embodiment, the node template 912 inherits from the node templates 914, 916, 918, and 920.

The user database 904 is stored at a storage element 922. The user database 904 is implemented by way of a user database model 924 (e.g., an executable graph-based model). The user database model 924 maintains user account data associated with users of the distributed banking system 900 at various node instances (for example, a node instance 926). The node instance 926 uses the node template 912 of the database schema model 910. Hence, the node instance 926 is extended by way of a tenant overlay node 928 that includes a set of constraints to be adhered to by the node instance 926 while using the node template 912. Further, the node instance 926 is extended by way of an overlay node 930 that includes processing logic for calculating total annual deposit in a user account associated with the node instance 926. The overlay node 930 is associated with another overlay node 932. That is to say that, the overlay node 930 is dependent on the overlay node 932 for one or more operations associated therewith.

The administrator module 906 is stored at a storage element 934. The administrator module 906 is implemented by way of an administrator model 936 (e.g., an executable graph-based model). The administrator model 936 calculates a total annual tax incurred by each user account associated with the distributed banking system 900. The administrator model 936 includes a node 938 that calculates the total tax incurred by a corresponding user account. The node 938 performs such calculation by way of an overlay node 940 associated therewith. Also, the node 938 calculates the total annual deposit in the corresponding user account for determining the total tax incurred. Therefore, the node 938 shares/uses the overlay node 930 of the user database model 924. Since the overlay node 930 is dependent on the overlay node 932, the node 938 further shares/uses the overlay node 932 for using the overlay node 930. As shown, the node 938 is associated with a tenant overlay node 942 that includes a set of constraints that are to be adhered to by the node 938 while sharing the overlay nodes 930 and 932.

Hence, the use of in-situ tenancy in the distributed banking system 900 allows for creation of different facets of the system 900 to be developed by different vendors using the overlay system 202. Also, each vendor associated with the system 900 may use resources owned by other vendors associated with the system 900. Beneficially, such sharing of resources reduces duplication of resources and increases efficiency of the system 900.

Figure 10:
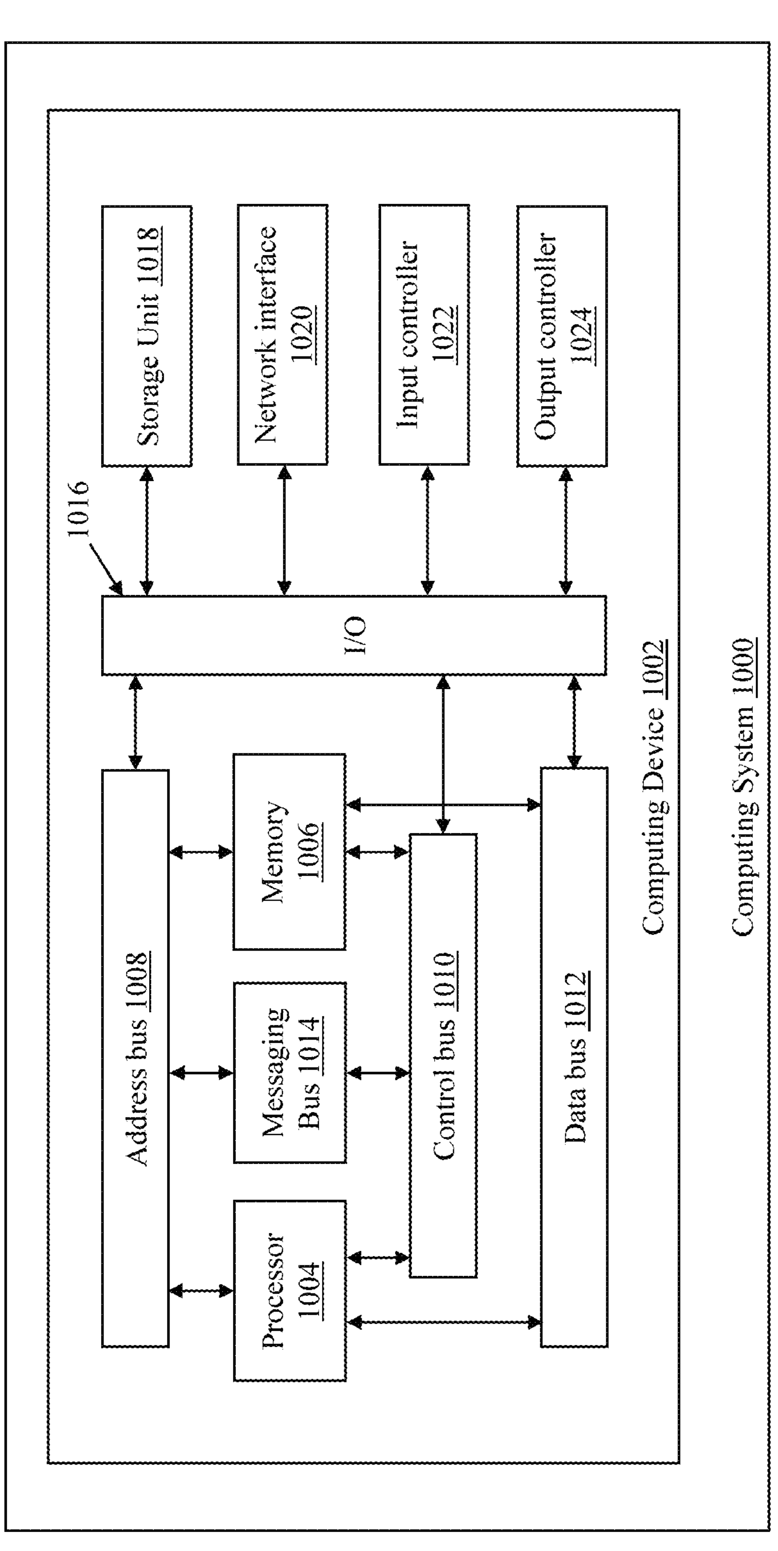
FIG. 10 shows an example computing system for carrying out methods of the present disclosure, in accordance with an embodiment of the present disclosure.

FIG. 10 shows an example computing system 1000 for carrying out the methods of the present disclosure, in accordance with an embodiment of the present disclosure. Specifically, FIG. 10 shows a block diagram of an embodiment of the computing system 1000 according to example embodiments of the present disclosure.

The computing system 1000 may be configured to perform any of the operations disclosed herein, such as, for example, any of the operations discussed with reference to the functional modules described in relation to FIG. 2. The computing system 1000 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1000 is a distributed system configured to function using multiple computing machines interconnected via a data network or bus system.

The computing system 1000 includes computing devices (such as a computing device 1002). The computing device 1002 includes one or more processors (such as a processor 1004) and a memory 1006. The processor 1004 may be any general-purpose processor(s) configured to execute a set of instructions. For example, the processor 1004 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1004 may be multiple processing units, a single processing core, multiple processing cores, special purpose processing cores, co-processors, or any combination thereof. The processor 1004 may be communicatively coupled to the memory 1006 via an address bus 1008, a control bus 1010, a data bus 1012, and a messaging bus 1014.

The memory 1006 may include non-volatile memories such as a read only memory (ROM), a programable read only memory (PROM), an erasable programmable read only memory (EPROM), a flash memory, or any other device capable of storing program instructions or data with or without applied power. The memory 1006 may also include volatile memories, such as a random-access memory (RAM), a static random-access memory (SRAM), a dynamic random-access memory (DRAM), and a synchronous dynamic random-access memory (SDRAM). The memory 1006 may include single or multiple memory modules. While the memory 1006 is depicted as part of the computing device 1002, a person skilled in the art will recognize that the memory 1006 can be separate from the computing device 1002.

The memory 1006 may store information that can be accessed by the processor 1004. For instance, the memory 1006 (e.g., one or more non-transitory computer-readable storage mediums, memory devices) may include computer-readable instructions (not shown) that can be executed by the processor 1004. The computer-readable instructions may be software written in any suitable programming language or may be implemented in hardware. Additionally, or alternatively, the computer-readable instructions may be executed in logically and/or virtually separate threads on the processor 1004. For example, the memory 1006 may store instructions (not shown) that when executed by the processor 1004 cause the processor 1004 to perform operations such as any of the operations and functions for which the computing system 1000 is configured, as described herein. Additionally, or alternatively, the memory 1006 may store data (not shown) that can be obtained, received, accessed, written, manipulated, created, and/or stored. The data can include, for instance, the data and/or information described herein in relation to FIGS. 1-9. In some implementations, the computing device 1002 may obtain from and/or store data in one or more memory device(s) that are remote from the computing system 1000.

The computing device 1002 may further include an input/output (I/O) interface 1016 communicatively coupled to the address bus 1008, the control bus 1010, and the data bus 1012. The data bus 1012 and messaging bus 1014 may include a plurality of tunnels that may support parallel execution of messages by the overlay system 202. The I/O interface 1016 is configured to couple to one or more external devices (e.g., to receive and send data from/to one or more external devices). Such external devices, along with the various internal devices, may also be known as peripheral devices. The I/O interface 1016 may include both electrical and physical connections for operably coupling the various peripheral devices to the computing device 1002. The I/O interface 1016 may be configured to communicate data, addresses, and control signals between the peripheral devices and the computing device 1002. The I/O interface 1016 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, or the like. The I/O interface 1016 is configured to implement only one interface or bus technology. Alternatively, the I/O interface 1016 is configured to implement multiple interfaces or bus technologies. The I/O interface 1016 may include one or more buffers for buffering transmissions between one or more external devices, internal devices, the computing device 1002, or the processor 1004. The I/O interface 1016 may couple the computing device 1002 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1016 may couple the computing device 1002 to various output devices, including video displays, speakers, printers, projectors, tactile feedback devices, automation control, robotic components, actuators, motors, fans, solenoids, valves, pumps, transmitters, signal emitters, lights, and so forth.

The computing system 1000 may further include a storage unit 1018, a network interface 1020, an input controller 1022, and an output controller 1024. The storage unit 1018, the network interface 1020, the input controller 1022, and the output controller 1024 are communicatively coupled to the central control unit (e.g., the memory 1006, the address bus 1008, the control bus 1010, and the data bus 1012) via the I/O interface 1016. The network interface 1020 communicatively couples the computing system 1000 to one or more networks such as wide area networks (WAN), local area networks (LAN), intranets, the Internet, wireless access networks, wired networks, mobile networks, telephone networks, optical networks, or combinations thereof. The network interface 1020 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1018 is a computer-readable medium, preferably a non-transitory computer-readable medium, comprising one or more programs, the one or more programs comprising instructions which when executed by the processor 1004 cause the computing system 1000 to perform the method steps of the present disclosure. Alternatively, the storage unit 1018 is a transitory computer-readable medium. The storage unit 1018 can include a hard disk, a floppy disk, a compact disc read only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1018 stores one or more operating systems, application programs, program modules, data, or any other information. The storage unit 1018 is part of the computing device 1002. Alternatively, the storage unit 1018 is part of one or more other computing machines that are in communication with the computing device 1002, such as servers, database servers, cloud storage, network attached storage, and so forth.

The input controller 1022 may include suitable logic, circuitry, interfaces, and/or code, executable by the circuitry, that may be configured to control one or more input devices that may be configured to receive an input (the stimulus 230) for the overlay system 202. The output controller 1024 may include suitable logic, circuitry, interfaces, and/or code, executable by the circuitry, that may be configured to control one or more output devices that may be configured to render/output the outcome of the operation executed to process the received input (the stimulus 230).

Figure 11:
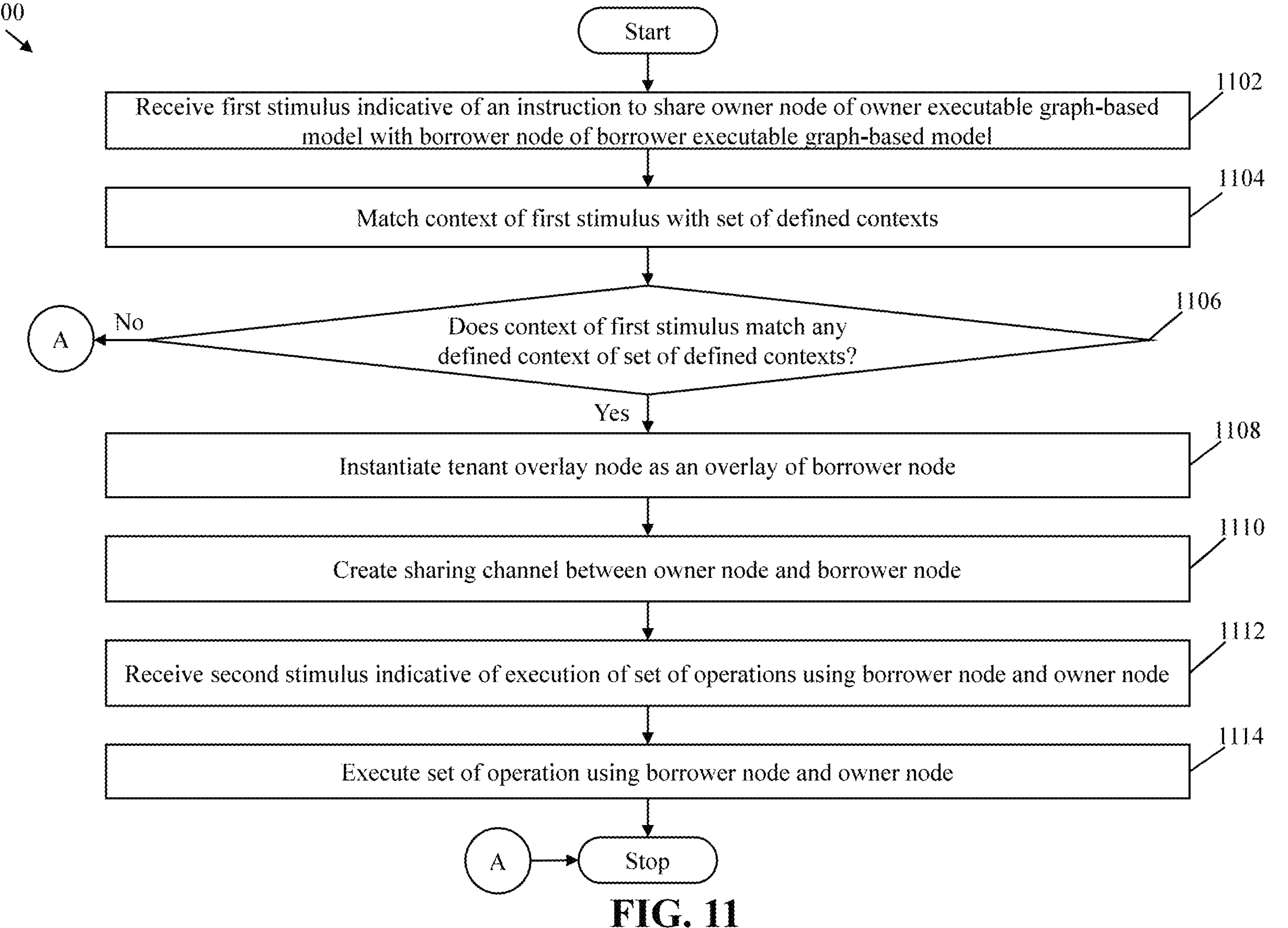
FIG. 11 is a flowchart that illustrates a method for facilitating in-situ tenancy in the plurality of executable graph-based models, in accordance with an embodiment of the present disclosure.

FIG. 11 is a flowchart 1100 that illustrates a method for facilitating in-situ tenancy in the plurality of executable graph-based models 203, in accordance with an embodiment of the present disclosure. Referring to FIG. 11, at 1102, the first stimulus is received. The first stimulus is indicative of an instruction to share an owner node of an owner executable graph-based model of the owner tenant with a borrower node of a borrower executable graph-based model of the borrower tenant. The controller module 206 is configured to receive the first stimulus.

At 1104, the context of the first stimulus is matched with the set of defined contexts. The context module 210 is configured to match the context of the first stimulus with the set of defined contexts.

At 1106, it is determined whether the context of the first stimulus matches any defined context of the set of defined contexts. When the context of the first stimulus does not match any defined context, the method terminates. When the context of the first stimulus matches one of the set of defined contexts, 1108 is executed.

At 1108, a tenant overlay node is instantiated as an overlay of the borrower node. The tenant management module 242 is configured to instantiate the tenant overlay node.

At 1110, a sharing channel between the owner node and the borrower node is created. The tenant management module 242 is configured to create the sharing channel between the owner node and the borrower node.

At 1112, the second stimulus is received. The second stimulus is indicative of execution of the set of operations using the borrower node and the owner node. In other words, the second stimulus is indicative of the execution of the set of operations using the borrower node such that the execution of the set of operations requires the borrower node to use the owner node. The controller module 206 is configured to receive the second stimulus.

At 1114, the set of operations is executed using the borrower node and the owner node. The one or more modules (for example, the controller module 206, the tenant management module 242, or the like) of the overlay system 202 are configured to execute the set of operations using the borrower node and the owner node.

The disclosed embodiments encompass numerous advantages including an efficient and seamless approach for facilitation of in-situ tenancy in the plurality of executable graph-based models 203. The systems and methods disclosed herein provide for an ability to share resources implemented in form of nodes that are owned by one executable graph-based model with other executable graph-based models, of the plurality of executable graph-based models 203. Such sharing of resources is performed in real time and in-situ. That is to say that, such sharing of resources is performed within the system and does not require any external operation to be performed to enable sharing of resources among the tenants of the overlay system 202. Further, the disclosed methods and systems allow each executable graph-based model to own corresponding resources. Hence, the disclosed methods and systems allow each executable graph-based model to exist separately from other executable graph-based models. Therefore, each executable graph-based model may have customized technologies (for example, database schema, security, or the like). Customized security allows each executable graph-based model to secure corresponding data in accordance with its sensitivity. For example, data with higher sensitivity may require more protection than data with lower sensitivity. Further, the disclosed methods and systems allow the owner of a shared resource to determine how much to share by implementing partial sharing. The disclosed methods and systems allow the owner of the shared resource to determine how to share by implementing the sharing types (read-only sharing, read and write sharing, and read, write, and execute sharing). The disclosed methods and systems allow owner of the shared resource to determine the set of constraints that is to be adhered to while sharing the resource. Further, the systems and methods disclosed herein allow for the segregation of data and processing logic and hence ensure mutual independence thereof. Application areas of the systems and methods disclosed herein may include, but are not limited to, industrial processes, robotics, home security, automation industry, or the like.

Certain embodiments of the disclosure may be found in the disclosed systems, methods, and non-transitory computer-readable medium, for facilitating in-situ tenancy in the plurality of executable graph-based models. The methods and systems disclosed herein include various operations performed by the processing circuitry (e.g., the controller module 206, the transaction module 208, the message management module 214, the tenant management module 242, any other element of the overlay system 202, or a combination of two or more elements of the overlay system 202).

The systems disclosed herein includes a plurality of storage elements configured to store the plurality of executable graph-based models. Each executable graph-based model includes a plurality of nodes. A first storage element and a second storage element store a first executable graph-based model and a second executable graph-based model, respectively. The processing circuitry is coupled to the plurality of storage elements, and configured to receive the first stimulus associated with the overlay system. The first stimulus is indicative of the instruction to share the first node of the first executable graph-based model with the second node of the second executable graph-based model. The processing circuitry is further configured to instantiate, for processing the first stimulus, the first tenant overlay node as an overlay of the second node. The first tenant overlay node includes the first set of constraints to be adhered to by the second node while sharing the first node. The processing circuitry is further configured to create the first sharing channel between the first node and the second node. The first sharing channel corresponds to the first medium between the first storage element and the second storage element. The first sharing channel and the first tenant overlay node enable the sharing of the first node with the second node.

In some embodiments, the processing circuitry is further configured to receive a second stimulus indicative of execution of the set of operations using the second node such that the execution of the set of operations requires the second node to share the first node. The processing circuitry is further configured to map the second stimulus to the second executable graph-based model of the plurality of executable graph-based models based on the context of the second stimulus. The processing circuitry may be further configured to map the second stimulus to the second node of the second executable graph-based model based on the context of the second stimulus. The processing circuitry is further configured to execute the set of operations using the second node and the first node shared with the second node. The first node is used for the execution of the set of operations in accordance with the first set of constraints.

In some embodiments, the processing circuitry is further configured to (i) create a feedback channel between the first node and the second node, and (ii) communicate, via the feedback channel, feedback data of the second node to the first node. The feedback data is indicative of at least one of a group consisting of (i) the operational data associated with stimulus processing of the second stimulus indicative of execution of the set of operations using the second node such that the execution of the set of operations requires the second node to share the first node, (ii) an outcome of the execution of the set of operations, and (iii) a set of modifications associated with the first node. The set of modifications is performed during the execution of the set of operations.

In some embodiments, each node, of the plurality of nodes, of each executable graph-based model, of the plurality of executable graph-based models, includes one of a group consisting of (i) a data structure associated with the corresponding executable graph-based model, (ii) data associated with the corresponding executable graph-based model, and (iii) processing logic associated with the corresponding executable graph-based model.

In some embodiments, each node, of the plurality of nodes, of each executable graph-based model, of the plurality of executable graph-based models, corresponds to one of a group consisting of a vertex node, an edge node, an overlay node, and a role node.

In some embodiments, the first set of constraints is indicative of at least one of a group consisting of (i) a data structure sharing policy that defines a first set of rules for sharing data structure defined by way of the first node, (ii) a data sharing policy that defines a second set of rules for sharing data stored at the first node, (iii) a processing logic sharing policy that defines a third set of rules for sharing processing logic defined using the first node, and (iv) a process data sharing policy that defines a fourth set of rules for sharing process data. The process data is generated based on execution of the processing logic defined using the first node.

In some embodiments, based on the first node being a node template of the first executable graph-based model, the first set of constraints corresponds to a data structure sharing policy. The data structure sharing policy defines a set of rules for sharing a data structure defined by way of the first node.

In some embodiments, based on the first node being a node of the first executable graph-based model that stores data, the first set of constraints corresponds to a data sharing policy. The data sharing policy defines a set of rules for sharing the data stored at the first node.

In some embodiments, based on the first node being an overlay node of the first executable graph-based model, the first set of constraints corresponds to at least one of a processing logic sharing policy and a process data sharing policy. The processing logic sharing policy defines a first set of rules for sharing processing logic defined using the first node. The process data sharing policy defines a second set of rules for sharing process data. The process data is generated based on execution of the processing logic defined using the first node.

In some embodiments, each node, of the plurality of nodes, of each executable graph-based model, of the plurality of executable graph-based models, has corresponding metadata associated therewith. The metadata is indicative of sharing criteria of the corresponding node.

In some embodiments, the processing circuitry is further configured to determine the first set of constraints based on the sharing criteria indicated by first metadata of the first node.

In some embodiments, the processing circuitry is further configured to receive the second stimulus associated with the overlay system. The second stimulus is indicative of an instruction to share a third node, of a third executable graph-based model of the plurality of executable graph-based models, with the second node. The third executable graph-based model is stored in a third storage element of the plurality of storage elements. The processing circuitry is further configured to instantiate a second tenant overlay node as an overlay of the second node. The second tenant overlay node includes a second set of constraints to be adhered to by the second node while sharing the third node. The processing circuitry is further configured to create a second sharing channel between the third node and the second node. The second sharing channel corresponds to a second medium between the second storage element and the third storage element. The second sharing channel and the second tenant overlay node enable the sharing of the third node with the second node.

In some embodiments, the processing circuitry is further configured to receive the second stimulus associated with the overlay system. The second stimulus is indicative of an instruction to share a third node, of a third executable graph-based model of the plurality of executable graph-based models with the second node. The third executable graph-based model is stored in a third storage element of the plurality of storage elements. The first set of constraints, of the first tenant overlay node, is further adhered to by the second node while sharing the third node. The processing circuitry is further configured to create a second sharing channel between the third node and the second node. The second sharing channel corresponds to a second medium between the second storage element and the third storage element. The second sharing channel and the first tenant overlay node enable the sharing of the third node with the second node.

In some embodiments, the processing circuitry is further configured to receive a second stimulus associated with the overlay system. The second stimulus is indicative of an instruction to share the first node with a third node of a third executable graph-based model of the plurality of executable graph-based models. The third executable graph-based model is stored in a third storage element of the plurality of storage elements. The processing circuitry is further configured to instantiate a second tenant overlay node as an overlay of the third node. The second tenant overlay node includes a second set of constraints to be adhered to by the third node while sharing the first node. The processing circuitry is further configured to create a second sharing channel between the first node and the third node. The second sharing channel corresponds to a second medium between the first storage element and the third storage element. The second sharing channel and the second tenant overlay node enable the sharing of the first node with the third node.

In some embodiments, the processing circuitry is further configured to receive a second stimulus associated with the overlay system. The second stimulus is indicative of an instruction to share the second node with a third node of a third executable graph-based model of the plurality of executable graph-based models. The third executable graph-based model is stored in a third storage element of the plurality of storage elements. The processing circuitry is configured to instantiate a second tenant overlay node as an overlay of the third node. The second tenant overlay node includes a second set of constraints to be adhered to by the third node while sharing the second node. The processing circuitry is further configured to create a second sharing channel between the third node and the second node. The second sharing channel corresponds to a second medium between the second storage element and the third storage element. The second sharing channel and the second tenant overlay node enable the sharing of the third node with the second node.

In some embodiments, the processing circuitry is further configured to receive a second stimulus associated with the overlay system. The second stimulus is indicative of an instruction to share a third node of the first executable graph-based model with a fourth node of the second executable graph-based model. The processing circuitry is further configured to instantiate a second tenant overlay node as an overlay of the fourth node. The second tenant overlay node includes a second set of constraints to be adhered to by the fourth node while sharing the third node. The processing circuitry is further configured to create a second sharing channel between the third node and the fourth node. The second sharing channel corresponds to a second medium between the first storage element and the second storage element. The second sharing channel and the second tenant overlay node enable the sharing of the third node with the fourth node.

In some embodiments, the processing circuitry is further configured to receive a second stimulus associated with the overlay system. The second stimulus is indicative of an instruction to share a third node of the first executable graph-based model with a fourth node of the second executable graph-based model. The processing circuitry is further configured to link the first tenant overlay node to the fourth node as an overlay of the fourth node. The first set of constraints is further adhered to by the fourth node while sharing the third node. The processing circuitry is further configured to create a second sharing channel between the third node and the fourth node. The second sharing channel corresponds to a second medium between the second storage element and the first storage element. The second sharing channel and the first tenant overlay node enable the sharing of the third node with the fourth node.

In some embodiments, the processing circuitry is further configured to receive a second stimulus associated with the overlay system. The second stimulus is indicative of an instruction to share a third node of the first executable graph-based model with a fourth node of a third executable graph-based model, that is stored in a third storage element of the plurality of storage elements. The third executable graph-based model is a child executable graph-based model of the second executable graph-based model. A second sharing channel exists as a second medium between the second storage element and the third storage element. The processing circuitry is further configured to instantiate a reference node of the third node in the second executable graph-based model. The reference node points to the third node in the first storage element via the first sharing channel. The processing circuitry is further configured to instantiate a second tenant overlay node as an overlay of the reference node. The second tenant overlay node includes a second set of constraints to be adhered to by the second executable graph-based model while sharing the third node. The processing circuitry is further configured to instantiate a third tenant overlay node as an overlay of the fourth node. The third tenant overlay node inherits from the second tenant overlay node and includes a set of cumulative constraints to be adhered to by the fourth node while sharing the third node. The first sharing channel, the second sharing channel, the second tenant overlay node, and the third tenant overlay node enable sharing of the third node with the fourth node.

In some embodiments, the set of cumulative constraints is a union of the second set of constraints and a third set of constraints that is to be adhered to by the fourth node while sharing the third node via the reference node, wherein the third set of constraints is to be adhered to by the fourth node while using the reference node to share the third node.

In some embodiments, the processing circuitry is further configured to create a first feedback channel between the fourth node and the reference node. The processing circuitry is further configured to create a second feedback channel between the reference node and the third node. The processing circuitry is further configured to communicate, via the first feedback channel, feedback data of the fourth node to the reference node. The processing circuitry is further configured to communicate, via the second feedback channel, the feedback data from the reference node to the third node. The feedback data is indicative of at least one of a group consisting of (i) operational data associated with stimulus processing of a second stimulus indicative of execution of a set of operations using the fourth node such that the execution of the set of operations requires the fourth node to share the third node, (ii) an outcome of the execution of the set of operations, and (iii) a set of modifications associated with the third node. The set of modifications is performed during the execution of the set of operations.

In some embodiments, the processing circuitry is further configured to receive a second stimulus associated with the overlay system. The second stimulus is indicative of an instruction to share a third node of the second executable graph-based model with a fourth node of the first executable graph-based model. The processing circuitry is further configured to instantiate a second tenant overlay node as an overlay of the fourth node. The second tenant overlay node includes a second set of constraints to be adhered to by the fourth node while sharing the third node. The processing circuitry is further configured to create a second sharing channel between the third node and the fourth node. The second sharing channel corresponds to a second medium between the first storage element and the second storage element.

The second sharing channel and the second tenant overlay node enable the sharing of the third node with the fourth node.

In some embodiments, the overlay system further comprises a context container that includes a set of defined contexts. The set of defined contexts includes a node sharing context that defines one or more operations to be executed to enable sharing of nodes among the plurality of executable graph-based models. The processing circuitry is further configured to execute a node sharing operation for sharing the first node with the second node based on a context of the first stimulus being a match to the node sharing context.

In some embodiments, the processing circuitry is further configured to instantiate a custom overlay node as an overlay of the first tenant overlay node. The custom overlay node includes a set of additional constraints that is to be further adhered to by the second node while sharing the first node.

In some embodiments, the processing circuitry is further configured to load, based on a second stimulus, at least one of a group consisting of the first node and the second node with corresponding data and processing logic. The second stimulus is indicative of a set of operations to be executed using the second node such that the execution of the set of operations requires the second node to share the first node.

In some embodiments, the sharing of the first node with the second node is one of a group consisting of a read-only sharing, a read and write sharing, and a read, write, and return sharing.

In some embodiments, based on the sharing of the first node being the read-only sharing, the first set of constraints enables the second node to access the first node and prevents the first node from being modified by the second node. Based on the sharing of the first node being the read and write sharing, the first set of constraints enables the second node to access and modify the first node. Based on the sharing of the first node being the read, write, and return sharing, the first set of constraints enables the second node to access the first node, modify the first node, and return at least one of (i) operational data associated with stimulus processing of a second stimulus that is indicative of execution of a set of operations using the second node such that the execution of the set of operations requires the second node to share the first node, (ii) an outcome of the execution of the set of operations, and (iii) a set of modifications associated with the first node. The set of modifications is performed during the execution of the set of operations.

In some embodiments, the first node is dependent on a third node of the executable graph-based model. The first sharing channel and the first tenant overlay node further enable sharing of the third node with the second node.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating in-situ tenancy in the plurality of executable graph-based models. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:

a plurality of storage elements configured to store a plurality of executable graph-based models associated with the overlay system such that a first storage element and a second storage element store a first executable graph-based model and a second executable graph-based model, respectively, wherein each executable graph-based model, of the plurality of executable graph-based models, comprises a plurality of nodes; and processing circuitry that is coupled to the plurality of storage elements, and configured to:

receive a first stimulus associated with the overlay system, wherein the first stimulus is indicative of an instruction to share a first node of the first executable graph-based model with a second node of the second executable graph-based model;

instantiate, for processing the first stimulus, a first tenant overlay node as an overlay of the second node, wherein the first tenant overlay node includes a first set of constraints to be adhered to by the second node while sharing the first node; and create a first sharing channel between the first node and the second node, wherein the first sharing channel corresponds to a first medium between the first storage element and the second storage element, and wherein the first sharing channel and the first tenant overlay node enable the sharing of the first node with the second node.

2. The overlay system of 1, wherein the processing circuitry is further configured to:

receive a second stimulus indicative of execution of a set of operations using the second node such that the execution of the set of operations requires the second node to share the first node;

map the second stimulus to the second executable graph-based model of the plurality of executable graph-based models based on a context of the second stimulus;

map the second stimulus to the second node of the second executable graph-based model based on the context of the second stimulus; and execute the set of operations using the second node and the first node shared with the second node, wherein first node is used for the execution of the set of operations in accordance with the first set of constraints.

3. The overlay system of 1,
wherein the processing circuitry is further configured to (i) create a feedback channel between the first node and the second node, and (ii) communicate, via the feedback channel, feedback data of the second node to the first node, and
wherein the feedback data is indicative of at least one of a group consisting of (i) operational data associated with stimulus processing of a second stimulus indicative of execution of a set of operations using the second node such that the execution of the set of operations requires the second node to share the first node, (ii) an outcome of the execution of the set of operations, and (iii) a set of modifications associated with the first node, where the set of modifications is performed during the execution of the set of operations.

4. The overlay system of 1, wherein each node, of the plurality of nodes, of each executable graph-based model, of the plurality of executable graph-based models, comprises one of a group consisting of (i) a data structure associated with the corresponding executable graph-based model, (ii) data associated with the corresponding executable graph-based model, and (iii) processing logic associated with the corresponding executable graph-based model.

5. The overlay system of 1, wherein each node, of the plurality of nodes, of each executable graph-based model, of the plurality of executable graph-based models, corresponds to one of a group consisting of a vertex node, an edge node, an overlay node, and a role node.

6. The overlay system of 1, wherein the first set of constraints is indicative of at least one of a group consisting of
(i) a data structure sharing policy that defines a first set of rules for sharing a data structure defined by way of the first node,
(ii) a data sharing policy that defines a second set of rules for sharing data stored at the first node,
(iii) a processing logic sharing policy that defines a third set of rules for sharing processing logic defined using the first node, and
(iv) a process data sharing policy that defines a fourth set of rules for sharing process data, where the process data is generated based on execution of the processing logic defined using the first node.

7. The overlay system of 1, wherein based on the first node being a node template of the first executable graph-based model, the first set of constraints corresponds to a data structure sharing policy, and wherein the data structure sharing policy defines a set of rules for sharing a data structure defined by way of the first node.

8. The overlay system of 1, wherein based on the first node being a node of the first executable graph-based model that stores data, the first set of constraints corresponds to a data sharing policy, and wherein the data sharing policy defines a set of rules for sharing the data stored at the first node.

9. The overlay system of 1, wherein based on the first node based on an overlay node of the first executable graph-based model, the first set of constraints corresponds to at least one of a processing logic sharing policy and a process data sharing policy, wherein the processing logic sharing policy defines a first set of rules for sharing processing logic defined using the first node, and wherein the process data sharing policy defines a second set of rules for sharing process data, whereas the process data is generated based on execution of the processing logic defined using the first node.

10. The overlay system of 1, wherein each node, of the plurality of nodes, of each executable graph-based model, of the plurality of executable graph-based models, has corresponding metadata associated therewith, where the metadata is indicative of sharing criteria of the corresponding node.

11. The overlay system of 10, wherein the processing circuitry is further configured to determine the first set of constraints based on the sharing criteria indicated by first metadata of the first node.

12. The overlay system of 10,
wherein the sharing criteria of each node defines one or more rules,
wherein the processing circuitry is configured to determine a sharing type for the node based on the one or more rules defined by corresponding sharing criteria, and
wherein the sharing type includes a read-only sharing, a read and write sharing, and a read, write, and return sharing.

13. The overlay system of 1, wherein the processing circuitry is further configured to:
receive a second stimulus associated with the overlay system, wherein the second stimulus is indicative of an instruction to share a third node, of a third executable graph-based model of the plurality of executable graph-based models, with the second node, and wherein the third executable graph-based model is stored in a third storage element of the plurality of storage elements;
instantiate a second tenant overlay node as an overlay of the second node, wherein the second tenant overlay node includes a second set of constraints to be adhered to by the second node while sharing the third node; and
create a second sharing channel between the third node and the second node, wherein the second sharing channel corresponds to a second medium between the second storage element and the third storage element, and wherein the second sharing channel and the second tenant overlay node enable the sharing of the third node with the second node.

14. The overlay system of 1, wherein the processing circuitry is further configured to:
receive a second stimulus associated with the overlay system, wherein the second stimulus is indicative of an instruction to share a third node, of a third executable graph-based model of the plurality of executable graph-based models with the second node, wherein the third executable graph-based model is stored in a third storage element of the plurality of storage elements, and wherein the first set of constraints, of the first tenant overlay node, is further adhered to by the second node while sharing the third node; and
create a second sharing channel between the third node and the second node, wherein the second sharing channel corresponds to a second medium between the second storage element and the third storage element, and wherein the second sharing channel and the first tenant overlay node enable the sharing of the third node with the second node.

15. The overlay system of 1, wherein, processing circuitry is further configured to:
receive a second stimulus associated with the overlay system, wherein the second stimulus is indicative of an instruction to share the first node with a third node, of a third executable graph-based model of the plurality of executable graph-based models, and wherein the third executable graph-based model is stored in a third storage element of the plurality of storage elements;

instantiate a second tenant overlay node as an overlay of the third node, wherein the second tenant overlay node includes a second set of constraints to be adhered to by the third node while sharing the first node; and create a second sharing channel between the first node and the third node, wherein the second sharing channel corresponds to a second medium between the first storage element and the third storage element, and wherein the second sharing channel and the second tenant overlay node enable the sharing of the first node with the third node.

16. The overlay system of 1, wherein the processing circuitry is further configured to:

receive a second stimulus associated with the overlay system, wherein the second stimulus is indicative of an instruction to share the second node with a third node of a third executable graph-based model of the plurality of executable graph-based models, and wherein the third executable graph-based model is stored in a third storage element of the plurality of storage elements;

instantiate a second tenant overlay node as an overlay of the third node, wherein the second tenant overlay node includes a second set of constraints to be adhered to by the third node while sharing the second node; and create a second sharing channel between the third node and the second node, wherein the second sharing channel corresponds to a second medium between the second storage element and the third storage element, and wherein the second sharing channel and the second tenant overlay node enable the sharing of the third node with the second node.

17. The overlay system of 1, wherein the processing circuitry is further configured to:

receive a second stimulus associated with the overlay system, wherein the second stimulus is indicative of an instruction to share a third node of the first executable graph-based model with a fourth node of the second executable graph-based model;

instantiate a second tenant overlay node as an overlay of the fourth node, wherein the second tenant overlay node includes a second set of constraints to be adhered to by the fourth node while sharing the third node; and create a second sharing channel between the third node and the fourth node, wherein the second sharing channel corresponds to a second medium between the first storage element and the second storage element, and wherein the second sharing channel and the second tenant overlay node enable the sharing of the third node with the fourth node.

18. The overlay system of 1, wherein the processing circuitry is further configured to:

receive a second stimulus associated with the overlay system, wherein the second stimulus is indicative of an instruction to share a third node of the first executable graph-based model with a fourth node of the second executable graph-based model;

link the first tenant overlay node to the fourth node as an overlay of the fourth node, wherein the first set of constraints is further adhered to by the fourth node while sharing the third node; and create a second sharing channel between the third node and the fourth node, wherein the second sharing channel corresponds to a second medium between the second storage element and the first storage element, and wherein the second sharing channel and the first tenant overlay node enable the sharing of the third node with the fourth node.

19. The overlay system of 1, wherein the processing circuitry is further configured to:

receive a second stimulus associated with the overlay system, wherein the second stimulus is indicative of an instruction to share a third node of the first executable graph-based model with a fourth node of a third executable graph-based model, that is stored in a third storage element of the plurality of storage elements, wherein the third executable graph-based model is a child executable graph-based model of the second executable graph-based model, and wherein a second sharing channel exists as a second medium between the second storage element and the third storage element;

instantiate a reference node of the third node in the second executable graph-based model, where the reference node points to the third node in the first storage element via the first sharing channel;

instantiate a second tenant overlay node as an overlay of the reference node, wherein the second tenant overlay node includes a second set of constraints to be adhered to by the second executable graph-based model while sharing the third node; and instantiate a third tenant overlay node as an overlay of the fourth node, wherein the third tenant overlay node inherits from the second tenant overlay node and includes a set of cumulative constraints to be adhered to by the fourth node while sharing the third node, and wherein the first sharing channel, the second sharing channel, the second tenant overlay node, and the third tenant overlay node enable sharing of the third node with the fourth node.

20. The overlay system of 19, wherein the set of cumulative constraints is a union of the second set of constraints and a third set of constraints that is to be adhered to by the fourth node while sharing the reference node to share the third node.

21. The overlay system of 19, wherein the processing circuitry is further configured to:

create a first feedback channel between the fourth node and the reference node;

create a second feedback channel between the reference node and the third node;

communicate, via the first feedback channel, feedback data of the fourth node to the reference node; and communicate, via the second feedback channel, the feedback data from the reference node to the third node, wherein the feedback data is indicative of at least one of a group consisting of (i) operational data associated with stimulus processing of a second stimulus indicative of execution of a set of operations using the fourth node such that the execution of the set of operations requires the fourth node to share the third node, (ii) an outcome of the execution of the set of operations, and (iii) a set of modifications associated with the third node, where the set of modifications is performed during the execution of the set of operations.

22. The overlay system of 1, wherein the processing circuitry is further configured to:

receive a second stimulus associated with the overlay system, wherein the second stimulus is indicative of an instruction to share a third node of the second executable graph-based model with a fourth node of the first executable graph-based model;

instantiate a second tenant overlay node as an overlay of the fourth node, wherein the second tenant overlay node includes a second set of constraints to be adhered to by the fourth node while sharing the third node; and create a second sharing channel between the third node and the fourth node, wherein the second sharing channel corresponds to a second medium between the first storage element and the second storage element, and wherein the second sharing channel and the second tenant overlay node enable the sharing of the third node with the fourth node.

23. The overlay system of 1, further comprising a context container that includes a set of defined contexts, wherein the set of defined contexts includes a node sharing context that defines one or more operations to be executed to enable sharing of nodes among the plurality of executable graph-based models, and wherein the processing circuitry is further configured to execute a node sharing operation for sharing the first node with the second node based on a context of the first stimulus being a match to the node sharing context.

24. The overlay system of 1, wherein the processing circuitry is further configured to instantiate a custom overlay node as an overlay of the first tenant overlay node, where the custom overlay node includes a set of additional constraints that is to be further adhered to by the second node while sharing the first node.

25. The overlay system of 1, wherein the processing circuitry is further configured to load, based on a second stimulus, at least one of a group consisting of the first node and the second node with corresponding data and processing logic, and wherein the second stimulus is indicative of a set of operations to be executed using the second node such that the execution of the set of operations requires the second node to share the first node.

26. The overlay system of 1, wherein the sharing of the first node with the second node is one of a group consisting of a read-only sharing, a read and write sharing, and a read, write, and return sharing.

27. The overlay system of 26, wherein based on the sharing of the first node being the read-only sharing, the first set of constraints enables the second node to access the first node and prevents the first node from being modified by the second node, wherein based on the sharing of the first node being the read and write sharing, the first set of constraints enables the second node to access and modify the first node, and wherein based on the sharing of the first node being the read, write, and return sharing, the first set of constraints enables the second node to access the first node, modify the first node, and return at least one of (i) operational data associated with stimulus processing of a second stimulus that is indicative of execution of a set of operations using the second node such that the execution of the set of operations requires the second node to share the first node, (ii) an outcome of the execution of the set of operations, and (iii) a set of modifications associated with the first node, where the set of modifications is performed during the execution of the set of operations.

28. the Overlay System of 1, wherein the first node is dependent on a third node of the executable graph-based model, and wherein the first sharing channel and the first tenant overlay node further enable sharing of the third node with the second node.

29. A method, Comprising:

receiving, by processing circuitry of an overlay system, a stimulus associated with the overlay system, wherein a plurality of executable graph-based models associated with the overlay system is stored in a plurality of storage elements of the overlay system such that a first executable graph-based model and a second executable graph-based model are stored in a first storage element and a second storage element store, respectively, wherein each executable graph-based model of the plurality of executable graph-based models comprises a plurality of nodes, and wherein the stimulus is indicative of an instruction to share a first node of the first executable graph-based model with a second node of the second executable graph-based model, instantiating, by the processing circuitry, a tenant overlay node as an overlay of the second node for processing the stimulus, wherein the tenant overlay node includes a set of constraints to be adhered to by the second node while sharing the first node; and creating, by the processing circuitry, a sharing channel between the first node and the second node, wherein the sharing channel corresponds to a medium between the first storage element and the second storage element, and wherein first sharing channel and the first tenant overlay node enable the sharing of the first node with the second node.

What is claimed is:

1. An overlay system, comprising:

a plurality of storage elements configured to store a plurality of executable graph-based models associated with the overlay system such that a first storage element and a second storage element store a first executable graph-based model and a second executable graph-based model, respectively, wherein each executable graph-based model, of the plurality of executable graph-based models, comprises a plurality of nodes; and processing circuitry that is coupled to the plurality of storage elements, and configured to:

receive a first stimulus associated with the overlay system, wherein the first stimulus is indicative of an instruction to share a first node of the first executable graph-based model with a second node of the second executable graph-based model;

determine, based on a context of the first stimulus, that the first stimulus corresponds to a node sharing operation;

instantiate, for processing the first stimulus, a first tenant overlay node as an overlay of the second node, wherein the first tenant overlay node includes a first set of constraints to be adhered to by the second node while sharing the first node; and create a first sharing channel between the first node and the second node, wherein the first sharing channel and the first tenant overlay node enable the sharing of the first node with the second node.

2. The overlay system of claim 1, wherein each node, of the plurality of nodes, of each executable graph-based model, of the plurality of executable graph-based models, comprises one of a group consisting of (i) a data structure associated with the corresponding executable graph-based model, (ii) data associated with the corresponding executable graph-based model, and (iii) processing logic associated with the corresponding executable graph-based model.

3. The overlay system of claim 1, wherein the first set of constraints is indicative of at least one of a group consisting of:

(i) a data structure sharing policy that defines a first set of rules for sharing a data structure defined by way of the first node, (ii) a data sharing policy that defines a second set of rules for sharing data stored at the first node, (iii) a processing logic sharing policy that defines a third set of rules for sharing processing logic defined using the first node, and (iv) a process data sharing policy that defines a fourth set of rules for sharing process data, where the process data is generated based on execution of the processing logic defined using the first node.

4. The overlay system of claim 1, wherein the processing circuitry is further configured to:

receive a second stimulus associated with the overlay system, wherein the second stimulus is indicative of an instruction to share a third node of the first executable graph-based model with a fourth node of a third executable graph-based model, that is stored in a third storage element of the plurality of storage elements, wherein the third executable graph-based model is a child executable graph-based model of the second executable graph-based model, and wherein a second sharing channel exists as a second medium between the second storage element and the third storage element;

instantiate a reference node of the third node in the second executable graph-based model, where the reference node points to the third node in the first storage element via the first sharing channel;

instantiate a second tenant overlay node as an overlay of the reference node, wherein the second tenant overlay node includes a second set of constraints to be adhered to by the second executable graph-based model while sharing the third node; and instantiate a third tenant overlay node as an overlay of the fourth node, wherein the third tenant overlay node inherits from the second tenant overlay node and includes a set of cumulative constraints to be adhered to by the fourth node while sharing the third node, wherein the first sharing channel, the second sharing channel, the second tenant overlay node, and the third tenant overlay node enable sharing of the third node with the fourth node, and wherein the set of cumulative constraints is a union of the second set of constraints and a third set of constraints that is to be adhered to by the fourth node while sharing the reference node to share the third node.

5. The overlay system of claim 4, wherein the processing circuitry is further configured to:

create a first feedback channel between the fourth node and the reference node;

create a second feedback channel between the reference node and the third node;

communicate, via the first feedback channel, feedback data of the fourth node to the reference node; and communicate, via the second feedback channel, the feedback data from the reference node to the third node, wherein the feedback data is indicative of at least one of a group consisting of (i) operational data associated with stimulus processing of a second stimulus indicative of execution of a set of operations using the fourth node such that the execution of the set of operations requires the fourth node to share the third node, (ii) an outcome of the execution of the set of operations, and (iii) a set of modifications associated with the third node, where the set of modifications is performed during the execution of the set of operations.

6. The overlay system of claim 1, wherein the processing circuitry is further configured to:

receive a second stimulus associated with the overlay system, wherein the second stimulus is indicative of an instruction to share a third node of the second executable graph-based model with a fourth node of the first executable graph-based model;

instantiate a second tenant overlay node as an overlay of the fourth node, wherein the second tenant overlay node includes a second set of constraints to be adhered to by the fourth node while sharing the third node; and create a second sharing channel between the third node and the fourth node, wherein the second sharing channel corresponds to a second medium between the first storage element and the second storage element, and wherein the second sharing channel and the second tenant overlay node enable the sharing of the third node with the fourth node.

7. The overlay system of claim 1, further comprising a context container that includes a set of defined contexts, wherein the set of defined contexts includes a node sharing context that defines one or more operations to be executed to enable sharing of nodes among the plurality of executable graph-based models, and wherein the processing circuitry is further configured to execute a node sharing operation for sharing the first node with the second node based on a context of the first stimulus being a match to the node sharing context.

8. The overlay system of claim 1, wherein the processing circuitry is further configured to instantiate a custom overlay node as an overlay of the first tenant overlay node, where the custom overlay node includes a set of additional constraints that is to be further adhered to by the second node while sharing the first node.

9. The overlay system of claim 1, wherein the sharing of the first node with the second node is one of a group consisting of a read-only sharing, a read and write sharing, and a read, write, and return sharing, wherein based on the sharing of the first node being the read-only sharing, the first set of constraints enables the second node to access the first node and prevents the first node from being modified by the second node, wherein based on the sharing of the first node being the read and write sharing, the first set of constraints enables the second node to access and modify the first node, and wherein based on the sharing of the first node being the read, write, and return sharing, the first set of constraints enables the second node to access the first node, modify the first node, and return at least one of (i) operational data associated with stimulus processing of a second stimulus that is indicative of execution of a set of operations using the second node such that the execution of the set of operations requires the second node to share the first node, (ii) an outcome of the execution of the set of operations, and (iii) a set of modifications associated with the first node, where the set of modifications is performed during the execution of the set of operations.

10. The overlay system of claim 1, wherein the first node is dependent on a third node of the executable graph-based model, and wherein the first sharing channel and the first tenant overlay node further enable sharing of the third node with the second node.

11. The overlay system of claim 1, wherein each node, of the plurality of nodes, of each executable graph-based model, of the plurality of executable graph-based models, corresponds to one of a group consisting of a vertex node, an edge node, an overlay node, and a role node.

12. The overlay system of claim 1, wherein based on the first node being a node template of the first executable graph-based model, the first set of constraints corresponds to a data structure sharing policy, and wherein the data structure sharing policy defines a set of rules for sharing a data structure defined by way of the first node.

13. The overlay system of claim 1, wherein based on the first node being a node of the first executable graph-based model that stores data, the first set of constraints corresponds to a data sharing policy, and wherein the data sharing policy defines a set of rules for sharing the data stored at the first node.

14. The overlay system of claim 1, wherein based on the first node being an overlay node of the first executable graph-based model, the first set of constraints corresponds to at least one of a processing logic sharing policy and a process data sharing policy, wherein the processing logic sharing policy defines a first set of rules for sharing processing logic defined using the first node, and wherein the process data sharing policy defines a second set of rules for sharing process data, whereas the process data is generated based on execution of the processing logic defined using the first node.

15. The overlay system of claim 1, wherein each node, of the plurality of nodes, of each executable graph-based model, of the plurality of executable graph-based models, has corresponding metadata associated therewith, where the metadata is indicative of sharing criteria of the corresponding node.

16. The overlay system of claim 15, wherein the processing circuitry is further configured to determine the first set of constraints based on the sharing criteria indicated by first metadata of the first node.

17. The overlay system of claim 15, wherein the sharing criteria of each node defines one or more rules, wherein the processing circuitry is configured to determine a sharing type for the node based on the one or more rules defined by corresponding sharing criteria, and wherein the sharing type includes a read-only sharing, a read and write sharing, and a read, write, and return sharing.

18. The overlay system of claim 1, wherein the processing circuitry is further configured to load, based on a second stimulus, at least one of a group consisting of the first node and the second node with corresponding data and processing logic, and wherein the second stimulus is indicative of a set of operations to be executed using the second node such that the execution of the set of operations requires the second node to share the first node.

19. A method, comprising:

receiving, by processing circuitry of an overlay system, a stimulus associated with the overlay system, wherein a plurality of executable graph-based models associated with the overlay system is stored in a plurality of storage elements of the overlay system such that a first executable graph-based model and a second executable graph-based model are stored in a first storage element and a second storage element, respectively, wherein each executable graph-based model of the plurality of executable graph-based models comprises a plurality of nodes, and wherein the stimulus is indicative of an instruction to share a first node of the first executable graph-based model with a second node of the second executable graph-based model, determining, by the processing circuitry, based on a context of the stimulus, that the stimulus corresponds to a node sharing operation;

instantiating, by the processing circuitry, a tenant overlay node as an overlay of the second node for processing the stimulus, wherein the tenant overlay node includes a set of constraints to be adhered to by the second node while sharing the first node; and creating, by the processing circuitry, a sharing channel between the first node and the second node, wherein the sharing channel and the tenant overlay node enable the sharing of the first node with the second node.

20. A non-transitory computer-readable medium storing computer-executable instructions, which when executed by a processing circuitry, cause the processing circuitry to perform operations comprising:

receiving a stimulus associated with an overlay system, wherein a plurality of executable graph-based models associated with the overlay system is stored in a plurality of storage elements of the overlay system such that a first executable graph-based model and a second executable graph-based model are stored in a first storage element and a second storage element, respectively, wherein each executable graph-based model of the plurality of executable graph-based models comprises a plurality of nodes, and wherein the stimulus is indicative of an instruction to share a first node of the first executable graph-based model with a second node of the second executable graph-based model, determining, based on a context of the stimulus, that the stimulus corresponds to a node sharing operation;

instantiating a tenant overlay node as an overlay of the second node for processing the stimulus, wherein the tenant overlay node includes a set of constraints to be adhered to by the second node while sharing the first node; and creating a sharing channel between the first node and the second node, wherein the sharing channel and the tenant overlay node enable the sharing of the first node with the second node.

* * * * *